United States Patent
Nakajima et al.

(10) Patent No.: US 7,465,889 B2
(45) Date of Patent: Dec. 16, 2008

(54) PUSHBUTTON SWITCH COVER SHEET AND METHOD OF MANUFACTURING THE SAME

(75) Inventors: Daisuke Nakajima, Tokyo (JP); Junko Hosaka, Tokyo (JP)

(73) Assignee: Polymatech Co., Ltd., Tokyo (JP)

(*) Notice: Subject to any disclaimer, the term of this patent is extended or adjusted under 35 U.S.C. 154(b) by 177 days.

(21) Appl. No.: 11/407,228

(22) Filed: Apr. 20, 2006

(65) Prior Publication Data
US 2006/0243267 A1 Nov. 2, 2006

(30) Foreign Application Priority Data
Apr. 28, 2005 (JP) ............... 2005-133414

(51) Int. Cl.
*H01H 9/26* (2006.01)
(52) U.S. Cl. .................... 200/5 A; 200/341
(58) Field of Classification Search ............ 200/5 A, 200/5 R, 341–345, 310–314
See application file for complete search history.

(56) References Cited

U.S. PATENT DOCUMENTS

| | | | | |
|---|---|---|---|---|
| RE29,440 E | * | 10/1977 | Durkee et al. | ............... 200/5 A |
| 4,128,744 A | | 12/1978 | Seeger | |
| 4,163,138 A | | 7/1979 | Harden | |
| 6,524,133 B2 | * | 2/2003 | Murakami | ................ 439/595 |
| 6,715,927 B1 | * | 4/2004 | Torisawa et al. | ............ 384/572 |
| 7,070,349 B2 | | 7/2006 | Dombrowski et al. | |
| 2003/0006361 A1 | * | 1/2003 | Tregoning | ............... 250/208.1 |
| 2005/0281605 A1 | | 12/2005 | Dombrowski et al. | |
| 2006/0012024 A1 | * | 1/2006 | Lin et al. | ................... 257/692 |
| 2006/0017693 A1 | * | 1/2006 | Nishinnura | ................ 345/156 |
| 2007/0246342 A1 | * | 10/2007 | Katori et al. | ................ 200/5 A |

FOREIGN PATENT DOCUMENTS

| | | |
|---|---|---|
| DE | 28 05 722 A1 | 8/1978 |
| GB | 2 311 658 A | 10/1997 |
| JP | 2003-197063 | 7/2003 |

OTHER PUBLICATIONS

Communication dated Nov. 19, 2007 from European Patent Office for Application No. 06008150.2-1231.

* cited by examiner

*Primary Examiner*—Michael A Friedhofer
*Assistant Examiner*—Lisa N Klaus
(74) *Attorney, Agent, or Firm*—Cermak Kenealy & Vaidya LLP; Tomoko Nakajima

(57) ABSTRACT

According to the present invention, there is provided a pushbutton switch cover sheet providing a unique design. A pushbutton switch cover sheet is provided with an operation plate of metal or hard resin having dividing grooves defining depressing operation members capable of displacement through depression. Therefore, there is no need to provide the casing of the apparatus with a frame defining key tops, making it possible to impart a novel design to the apparatus. The operation plate is formed as a thin plate, so it is possible to reduce a thickness of the apparatus as a whole. Further, the dividing grooves are provided with in-groove protrusions protruding into the dividing grooves and groove filling members fixed to the groove inner side surfaces and formed of a rubber-like elastic material, thereby making it possible to provide a pushbutton switch cover sheet of a high level of safety in which there is no fear of fingers being injured by the dividing grooves.

11 Claims, 19 Drawing Sheets

PUSHBUTTON SWITCH COVER SHEET AND METHOD OF MANUFACTURING THE SAME

BACKGROUND OF THE INVENTION

1. Field of the Invention

The present invention relates to a pushbutton switch cover sheet for use in an operating portion of an apparatus, such as a mobile phone, a personal digital assistant (PDA), a car navigation apparatus, or a car audio apparatus.

2. Related Background Art

Electronic/electric apparatuses for personal use have been reduced in size and thickness. Further, they have come to be endowed with various additional functions for enhancement in convenience for the user. In the case of a mobile phone, for example, efforts are being made to attract customers' interest by endowing it with not only the telephone call function but auxiliary functions, such as an e-mail function, internet connection function, and photographing function. However, for the product to sell better, such abundance in functions is not enough. Seeing that it is to be owned by an individual, it is important for this kind of product to have a unique and novel design. Thus, not only diversification in their functions as electronic/electric apparatuses, but diversification in their design is under way.

In other words, to say nothing of a design of a casing of a mobile phone, there is a tough competition in terms of design to achieve product differentiation also regarding a pushbutton switch cover member forming a surface portion of a portable phone. For example, JP 2003-197063 A discloses a resin key top in which a large number of metal foil pieces are laminated on a top surface of the resin key top to form a specular gloss layer, thereby attaining a metallic tone.

SUMMARY OF THE INVENTION

The present invention has been made in view of the above-mentioned circumstances. The present invention may provide a pushbutton switch cover member which imparts a unique design to the apparatus on which the pushbutton switch is provided.

To achieve the above, the present invention provides a pushbutton switch cover sheet in which dividing grooves defining depressing operation members capable of displacement through depression are provided in a single operation plate formed of metal or a hard resin.

As shown in FIG. 18, in a conventional ordinary pushbutton cover member (1), resin key tops (3) each of which corresponds to individual contact substrates are fixed one by one to a base sheet (2) formed of a rubber-like elastic material, with solely the resin key tops (3) being exposed through a frame (5*b*) provided in a casing (5*a*) of a mobile phone (5) (apparatus) shown in FIG. 19. Thus, a design of the pushbutton cover member cannot help being restricted by the frame (5*b*). On the other hand, when the pushbutton cover member (1) is attached to an apparatus (not shown) having no frame (5*b*) at all, an outer peripheral edge portion (2*a*) of the base sheet (2) is press-fitted and held over its entire periphery, and there is no restraint on the inner side of the press-fitted portion, so that the base sheet (2) is generally expanded and distorted by the weight load of the resin key tops (3).

In contrast, in a pushbutton switch cover sheet constituting a pushbutton switch cover member according to the present invention, dividing grooves defining depressing operation members capable of displacement through depression are provided in an operation plate formed of a metal plate or a hard resin plate, so even when there is no frame in the casing of the apparatus, there is no fear of the pushbutton switch cover sheet being distorted or deflected. Further, since it is possible to eliminate the frame of the casing of the apparatus, it is possible to impart a novel design to the apparatus. Further, the operation plate used in the present invention can have both the function of resin key tops formed of hard resin and undergoing depressing operation and the function of a base sheet formed of a rubber-like elastic material and adapted to be deflected upon depression and to be restored to the former state by removing the deflecting pressure. There is no need to provide the key tops as separate members. Thus, the operation plate is superior not only in design property but also in functionality. Since the operation plate is formed as a thin plate, this operation plate is also characterized in that being a thin plate helps to reduce the thickness of the apparatus as a whole. Further, when the operation plate is formed of metal and is used as an illumination type cover sheet, no light leakage through the operation plate occurs, and the operation plate reflects light from the inner light sources, so it is possible to provide a pushbutton switch cover sheet capable of effecting illumination with uniform and intense light from an intended position. The depressing operation members correspond to the depression operation portions in a pushbutton switch cover sheet.

The depressing operation members are defined by the dividing grooves, so it is possible to create depressing operation members of various configurations in conformity with changes in the configuration of the dividing grooves. Thus, it is possible to realize diversification in design.

For example, it is possible to form the depressing operation members defined by the dividing grooves as tongue-shaped members. Due to the tongue-shaped configuration, it is possible to depress the depressing operation members, with the proximal portions of the tongue-shaped members being supported.

Thus, the operation plate can be endowed with the function of pushbutton switch key tops. The distal end portions of the tongue-shaped members may be of a round configuration or a rectangular configuration.

Further, it is also possible to form the dividing grooves in a round-wave-like configuration, forming depressing operation members on either side of each dividing groove. Since the dividing grooves are formed in a round-wave-like configuration, and depressing operation members are formed on either side of each dividing groove, the end portions of the depressing operation members are rounded. Thus, there is no danger of the fingers or the like being injured by the end portions of the depressing operation members, which leads to a high level of safety. Further, there is realized a design giving a mild impression. Here, the "round-wave-like configuration" refers to a wave-like configuration in which the crest portions and the bottom portions of a wave are smoothly curved to create a generally rounded wave-like configuration.

Alternatively, it is possible to form the dividing grooves in a rectangular-wave-like configuration, forming depressing operation members on either side of each dividing groove. Since the dividing grooves are formed in a rectangular-wave-like configuration, and depressing operation members are formed on either side of each dividing groove, it is possible for the dividing operation members to have a large area. Further, when, for example, the operation plate is of a metallic tone, it is possible to realize a design with an accordingly sharp impression.

Here, the "rectangular-wave-like configuration refers to a wave-like configuration in which the crest portions and the bottom portions of a wave are rectangular to form a generally square wave.

It is possible for the depressing operation members thus defined by the dividing grooves to be provided so as to be adjacent and opposite to each other.

When the depressing operation members defined by the dividing grooves are provided so as to be adjacent and opposite to each other, it is possible to realize a configuration differing from the uniform configuration of the conventional frame formed in the casing of an apparatus. Thus, it is possible to provide a pushbutton switch cover sheet which is superior in terms of design.

Further, in the pushbutton switch cover sheet of the present invention, it is possible to provide the depressing operation members with display portions extending through the operation plate. Here, the term "display portions" refers to portions representing characters, numbers, symbols, figures, etc.

Since the depressing operation members are provided with the display portions extending through the operation plate, it is possible to identify the depressing operation members as input keys for inputting the characters, numbers, symbols, figures, etc. represented by the display portions. Further, the formation of the display portions can be effected simultaneously with the formation of the dividing grooves through stamping, so it is possible to provide a pushbutton switch cover sheet which easily allows formation of the display portions. Further, by providing an illumination light source inside the casing, it is possible to achieve the function of illumination type keys effecting illumination through the display portions.

It is also possible for the display portions to be formed so as to extend halfway through the operation plate. The expression "extending halfway through" means that there are formed no through-holes extending from the operating surface of the operation plate to the back surface thereof but that holes are formed so as not to reach the back surface of the operation plate, i.e., so as to form recesses.

The thickness of the operation plate may fall within a range of from 50 μm to 2000 μm. When the thickness of the operation plate ranges from 50 μm to 2000 μm, it is possible to impart rigidity to the entire pushbutton switch cover sheet and to provide a pushbutton switch cover sheet which is not distorted or deflected unless forced in. On the other hand, it is possible to exert the function of a pushbutton switch cover member, in which, upon depression, the depressing operation members can be deformed and in which the depressing operation members are restored to the former position by removing the depression.

The present invention further provides a pushbutton switch cover sheet having on the back side of the operating surface of the operation plate a base sheet formed of a rubber-like elastic material.

Since a base sheet formed of a rubber-like elastic material is provided on the back side of the operating surface of the operation plate, the operation plate is not directly pressed against the printed circuit board, and the printed circuit board is not easily damaged. Further, by covering the back side of the operating surface of the operation plate with the base sheet, it is possible to prevent intrusion of water through the dividing grooves and the display portions.

At positions under the depressing operation members of the operation plate and on the back side of the base sheet, the base sheet may have pushers to be pressed against contact electrodes. Due to the provision of the pushers to be pressed against the contact electrodes, it is possible for the depressing operation exerted on each depressing operation member to reliably cause conduction through the contact electrode, and it is possible to avoid an undesirable situation in which no input is effected although a depressing operation member has been depressed.

Further, in accordance with the present invention, the base sheet may be provided with in-groove protrusions protruding into the dividing grooves of the operation plate. Here, the term "in-groove protrusions protruding into the dividing grooves" refers to portions of the base sheet swelling from a fixation plane between the base sheet and the operation plate at positions where dividing grooves are formed in the operation plate to form empty spaces. The in-groove protrusions are formed so as to fill the dividing grooves. On the other hand, it is desirable for them to be formed so as to allow displacement of the depressing operation members through depression.

The base sheet has in-groove protrusions protruding into the dividing grooves of the operation plate, so even in a case in which the depressing operation members are deflected through depression to expose the edges of the dividing grooves, it is possible to avoid a situation in which the fingertips directly hit an edge due to the presence of the in-groove protrusions formed of a rubber-like elastic material. Thus, there is no fear of the fingertips being injured, thereby making it possible to provide a pushbutton switch cover sheet of a high level of safety.

The in-groove protrusions may be lightproof. By making the in-groove protrusions lightproof, it is possible to prevent light leakage through the dividing groove portions when the pushbutton cover sheet is applied to illumination type keys.

Further, in the pushbutton switch cover sheet of the present invention, it is possible to use a hard resin material for the operation plate, and to provide a thin metal film layer on the back side of the operating surface of the operation plate.

When applied to illumination type keys, the light applied from the inner light sources is reflected by the thin metal film layer provided on the back side of the operation plate, so a pushbutton switch cover sheet can be provided in which it is possible to effect illumination with uniform and intense light from a desired position.

Further, in the pushbutton switch cover sheet of the present invention, it is possible for the dividing grooves to be provided with groove filling members formed of a rubber-like elastic material and fixed to the inner side surfaces of the dividing grooves. The groove filling members formed of a rubber-like elastic material and entering the dividing grooves of the operation plate are formed in the dividing grooves, and the groove filling members are fixed to the inner side surfaces of the dividing grooves, so even when the depressing operation members are deflected, the groove filling members filling the dividing grooves follow the deformation of the depressing operation members, and no edges of the depressing operation members are exposed. Thus, it is possible to avoid injuring of the fingertips with the dividing grooves, thus making it possible to provide a pushbutton switch cover sheet of a high level of safety while maintaining the feel and design of the operation plate.

The groove filling members may be composed of the in-groove protrusions protruding into the dividing grooves from the base sheet and fixed to the inner side surfaces of the dividing grooves. By forming the base sheet and the groove filling members of the same material, it is advantageously possible to form the base sheet and the groove filling members as an integral unit. On the other hand, the groove filling members may also be formed as members separate from the base sheet.

When they are formed as members separate from the base sheet, it is possible to select and adopt a material most suited to the function of the groove filling members, for example, a material that is too soft for the base sheet.

Further, it is also possible for the groove filling members to be formed as ones which swell out of the dividing grooves and which are fixed to the groove edge surfaces of the dividing grooves on the operating surface of the operation plate or on the back side of the operating surface. The groove filling members swell out of the dividing grooves, and are fixed to the groove edge surfaces of the dividing grooves on the operating surface of the operation plate or on the back side of the operating surface, so they are fixed not only to the inner side surfaces of the dividing grooves but also to the upper surface constituting the operating surface of the operation plate or the back surface portion of the operating surface, whereby the bonding force exerted between the operation plate and the groove filling members is enhanced.

Thus, the fixation between the dividing grooves and the groove filling members is maintained, and separation does not easily occur. The portions sticking out of the dividing grooves to form a covering layer may be extended from a part of at least one of the operating surface of the operation plate continuous with the groove edges of the dividing grooves or the back side thereof to all of at least one of the operating surface of the operation plate or the back side thereof.

Furthermore, in accordance with the present invention, there may be provided a covering layer covering the operating surface of the operation plate, with the covering layer closing the dividing grooves. The covering layer closes the dividing grooves, so it is possible to provide a safe pushbutton switch cover sheet in which there is no fear of the fingertips being allowed to enter a dividing groove. In this case, it is not necessary to form the groove filling members in the dividing grooves.

A pushbutton switch cover sheet according to the present invention as described above can be manufactured by fusing the base sheet to the operation plate to integrate the operation plate with the base sheet.

The operation plate and the base sheet are integrated by fusing the base sheet to the operation plate, so it is possible to firmly attach the operation plate and the base sheet to each other without involving any gap therebetween, thus making it possible to provide a pushbutton switch cover member having no gaps allowing intrusion of water from the outside of the operation plate into the interior of the base sheet. Further, in this manufacturing method, the molten base sheet flows into the dividing grooves of the operation plate, so the in-groove protrusions can be obtained easily.

In particular, in a method of manufacturing a pushbutton switch cover sheet having a base sheet and in-groove protrusions, the base sheet is fused to the operation plate, and the in-groove protrusions protruding into the dividing grooves of the operation plate from the base sheet are provided, and further, the operation plate and the base sheet are integrated with each other to thereby produce the pushbutton switch cover sheet. By thus performing the production, the base sheet can be fixed to the operation plate, and the in-groove protrusions can be easily formed.

The pushbutton switch cover sheet of the present invention has a novel design not to be found in conventional pushbutton switch cover members. Further, the pushbutton switch cover sheet of the present invention helps to attain a reduction in weight, size, and thickness of the apparatus and to impart a design novelty to the apparatus on which the pushbutton switch cover sheet is mounted. In the case of an illumination type cover sheet, a satisfactory light guiding property is attained, and it is possible to effect uniform illumination from a desired position.

Further, the pushbutton switch cover sheet having in-groove protrusions, groove filling members, and a covering layer is a safe pushbutton switch cover sheet in which there is no fear of the fingertips being injured by the dividing grooves.

The present invention is not restricted to the above description. The advantages, features, and uses of the present invention will become more apparent from the following description given with reference to the accompanying drawings. It should be understood that all appropriate modifications not departing from the spirit of the present invention are covered by the scope of the present invention.

DESCRIPTION OF THE PREFERRED EMBODIMENTS

In the following, embodiments of the present invention will be described with reference to the drawings. A redundant description of the components that are the same as those of the prior art and of those that are common to the embodiments will be omitted. In the following description, the term "apparatus" refers to an electronic apparatus, and covers a mobile phone.

Figure 1:
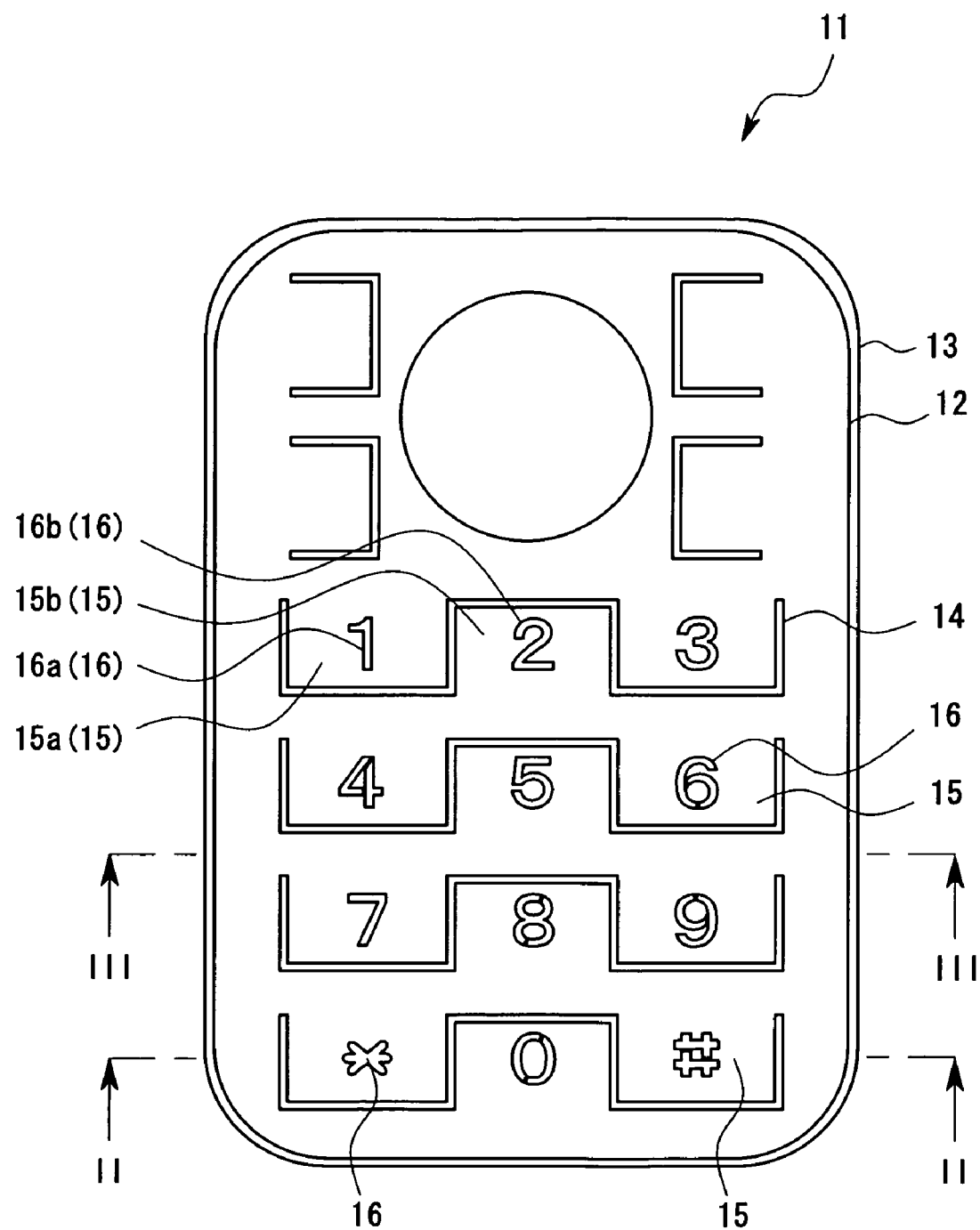
FIG. 1 is a plan view of a pushbutton switch cover sheet (cover sheet) according to a first embodiment of the present invention.
Figure 2:
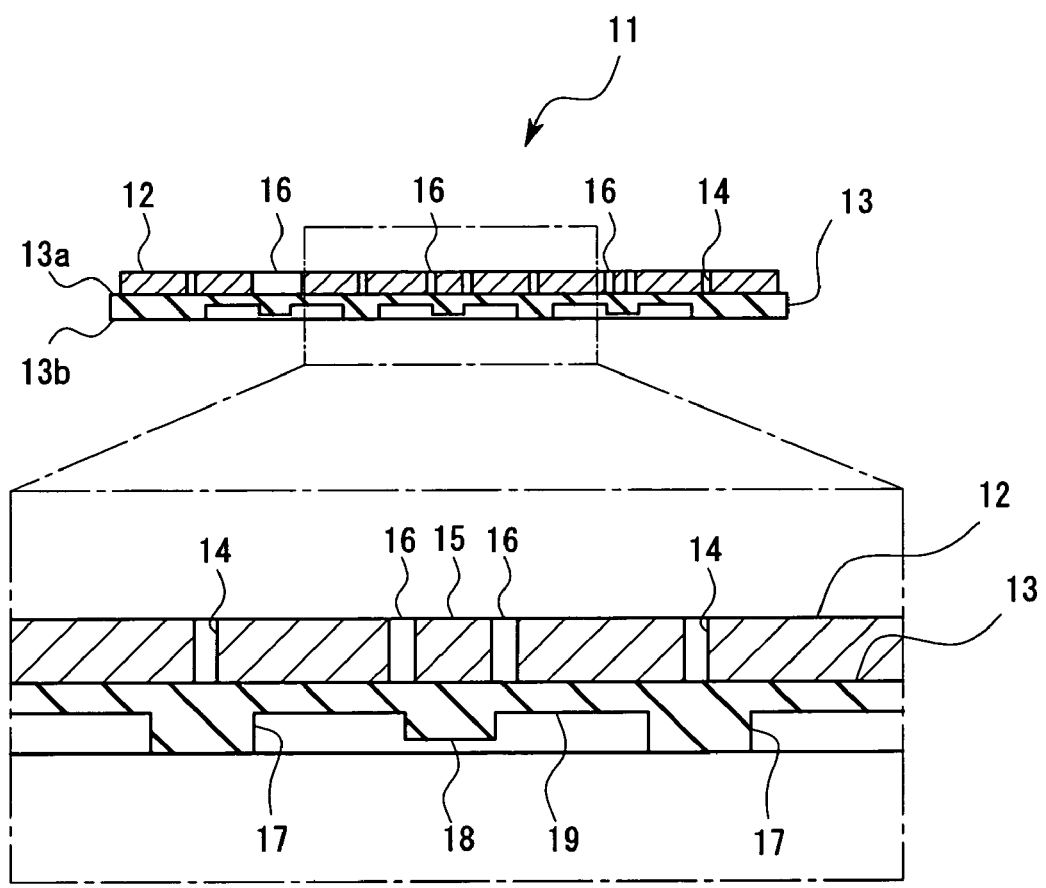
FIG. 2 is a sectional view of the cover sheet of FIG. 1 taken along the line II-II of FIG. 1.
Figure 3:
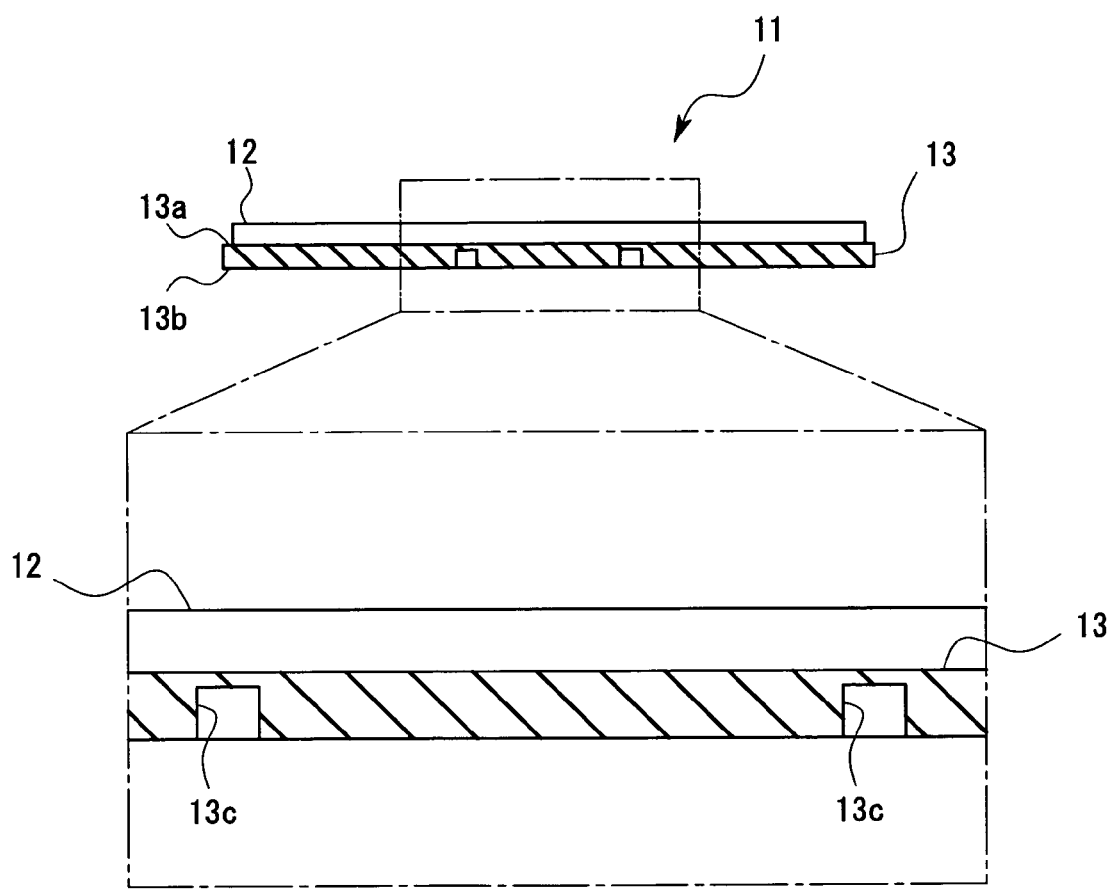
FIG. 3 is a sectional view of the cover sheet of FIG. 1 taken along the line III-III of FIG. 1.

First Embodiment {FIGS. 1 through 3}

A pushbutton switch cover sheet (11) (hereinafter also referred to as "cover sheet") according to a first embodiment of the present invention is equipped with an operation plate (12), which is integrated with a base sheet (13). The base sheet (13) may be formed of a rubber-like elastic material.

In the operation plate (12), rectangular-wave-like dividing grooves (14) may be formed by stamping in the plane of a single plate, and the tongue-shaped portions defined by the dividing grooves (14) constitute depressing operation members (15).

At the center of each depressing operation member (15), there is formed a display portion (16) representing a character, number, symbol, figure, indicia, or the like, which is formed by stamping like the dividing grooves (14) so as to extend through the operation plate (12). To be more specific, in FIG. 1, the dividing grooves (14) are provided in a substantially wave-like fashion. For example, a depressing operation member (15a), in which a display portion (16a) representing the number "1" is provided, is downwardly defined by the dividing groove (14), and a depressing operation member (15b), in which a display portion (16b) representing the number "2" is provided, is upwardly defined by the dividing groove (14). Thus, the depressing operation members (15a) and (15b) are oriented in opposite directions.

For the operation plate (12), a highly rigid material is suitably used from the viewpoint of maintaining the form. Examples of the material that can be used the operation plate (12) may include metals, such as stainless steel, aluminum, chromium, gold, silver, copper, nickel, and tin. Of those metals, stainless steel, aluminum, gold, and copper, which are easily formed into a thin plate, are preferable.

Instead of using a metal as the operation plate (12), it is also possible to use a hard resin, such as polycarbonate resin or ABS resin.

Usually, the thickness of the operation plate (12) ranges from 50 μm to 2000 μm. When the thickness is less than 50 μm, the rigidity of the operation plate (12) is rather low, and it is rather difficult to suppress distortion of the cover sheet (11). When the thickness of the operation plate (12) exceeds 2000 μm, the thickness limitation in normal specifications for the base sheet (13) is exceeded. The thickness of the operation plate (12) may also vary according to the material and the configuration of the depressing operation members (15). From the viewpoint of the demand for rigidity and a reduction in thickness, the thickness of the operation plate (12) may range from 70 μm to 300 μm.

The thickness of the operation plate (12) may also range from 50 μm to 300 μm. When the thickness of the operation plate (12) exceeds 300 μm, the formation of the dividing grooves (14) and the display portions (16) becomes rather difficult.

Further, the depression load increases, resulting in a rather poor operational feel.

When the thickness of the operation plate (12) is less than 50 μm, the rigidity is rather low, and it is difficult to suppress distortion of the cover sheet (11). The range of 50 μm to 70 μm is preferable since it is then possible to enhance the rigidity through formation of a covering layer and groove filling members. The formation of the dividing grooves (14) and the display portions (16) in the operation plate (12) can be effected by photo etching or the like.

The base sheet (13) is fixed to the back surface of the operation plate (12).

As shown in the plan view of FIG. 1, the base sheet (13) may have a rectangular outer configuration with rounded corners in conformity with the contour of the operation plate (12). However, the base sheet (13) having other shapes is within the scope of the invention. Also shown in the sectional views of FIGS. 2 and 3, the upper surface (13a) of the base sheet (13) is formed as a flat surface with no protrusions or recesses, while the back surface (13b) of the base sheet (13) has a plurality of recesses (19) so that support portions (17) supporting the entire base sheet (13) and pushers (18) to be pressed against contact electrodes protrude from the base sheet (13). The wall thickness of the portions of the base sheet (13) where the recesses (19) are formed is less than the wall thickness of the portions of the base sheet (13) where the support protrusions (17) or the pushers (18) are formed. The thin-walled portions of the base sheet (13) where the recesses (19) are formed can be displaced through depression together with the depressing operation members (15) of the operation plate (12). Further, to effect illumination through the display portions (16) with light from inner light sources provided inside the apparatus, the support portions (17) of the base sheet (13) has cutout portions (13c) into which the inner light sources may be inserted (FIG. 3). The operation plate (12) is situated above the cutout portions (13c).

The base sheet (13) being a rubber-like elastic material is within the scope of the invention. This rubber-like elastic material is superior in resiliency and flexible.

The rubber-like elastic material may include thermosetting elastomer. The thermosetting elastomer may be from the group consisting of silicone rubber, isoprene rubber, ethylene propylene rubber, butadiene rubber, chloroprene rubber, and natural rubber. The rubber-like elastic material including thermoplastic elastomer is also within the scope of the invention. The thermoplastic elastomer may be from the group consisting of a styrene, an ester, a urethane, an olefin, an amide, a butadiene, an ethylene vinyl acetate, a fluoro-rubber, an isoprene, and a chlorinated polyethylene. Of those rubber-like elastic materials, silicone rubber, a styrene thermoplastic elastomer, and an ester type thermoplastic elastomer are preferable since they are superior in resiliency, and have high durability. A light transmitting material may be used to obtain an illumination type cover sheet.

The operation plate (12) and the base sheet (13) can be fixed to each other by the following methods. In a first method, the operation plate (12) is arranged in a mold, and a rubber-like elastic material constituting base sheet (13) is poured in to effect fusion. In a second method, the operation plate (12) and the base sheet (13) separately formed are bonded together by using an adhesive. In the case of a structure in which the operation plate (12) is not held by the apparatus (1), the operation plate (12) may be fixed to the base sheet (13) so as not to be separated from the base sheet (13).

Next, the operation and effects of the cover sheet (11) of this embodiment will be described.

The tongue-shaped depressing operation members (15) are defined by the dividing grooves (14) except for their tongue-shaped proximal end portions. Thus, when depressed with the fingertips or the like, the cut portion of each depressing operation member (15) is deformed around the proximal end portion. Then, a pusher (18) provided on the base sheet (13) can be pressed against a contact electrode provided on a printed circuit board or the like (not shown) to turn the switch on. When the fingertips are removed, the depressing operation member (15) and the base sheet (13) are restored to the former state by their restoring force to turn the switch off.

In this way, the operation plate (12) has a hard feel and allows displacement of the pusher (18) through depression of the depressing operation member (15). Further, the operation plate (12) is in the form of a thin plate, so the operation plate (12) allows a reduction in the thickness of the apparatus as a whole.

In addition, it can provide a novel design which has not been known yet. Further, due to the rigidity of the operation plate (12), although the frame of the apparatus casing has been eliminated, no distortion or deflection is generated over the cover sheet (11), and no malfunction occurs. Further, even during the production of the cover sheet (11), there is no need to perform separate positioning on each key top before bonding the operation plate (12) to the base sheet (13) as in the case of the conventional pushbutton switch key sheet, and the operation plate (12) and the base sheet (13) can be easily fixed together.

Further, the base sheet (13) fixed to the operation plate (12) may impede water from entering the interior of the apparatus (1) through the dividing grooves (14) and the display portions (16) provided so as to extend through the operation plate (12), thus providing a high waterproof performance.

The light emitted upwardly from the inner light sources (not shown) situated in the cutout portions (13c) provided in the thick-walled portions of the base sheet (13) may be reflected by the operation plate (12) and efficiently guided through the base sheet (13). As a result, it is possible to avoid a situation in which solely the portions near the light sources are brightly illuminated, making it possible to uniformly illuminate the display portions (16).

Further, the pushers (18) to be pressed against the contact electrodes are provided under the depressing operation members (15) of the operation plate (12) and on the back side of the base sheet (13). Accordingly, it is possible to reliably effect conduction through the contact electrodes upon depression of the depressing operation members (15), and there arises no disadvantageous situation in which no input is effected although a depressing operation member (15) has been depressed.

Figure 4:
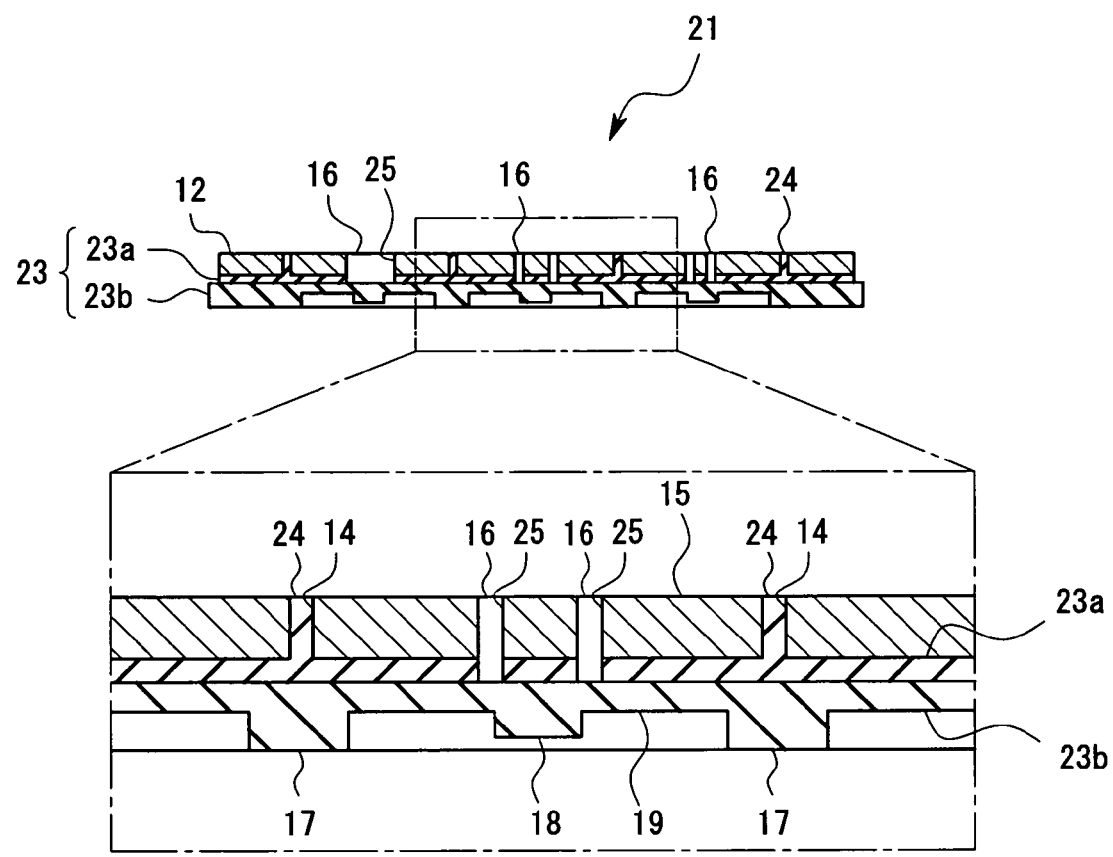
FIG. 4 is a sectional view, corresponding to FIG. 2, of a cover sheet according to a second embodiment of the present invention.

Second Embodiment {FIG. 4}

A pushbutton switch cover sheet (21) according to a second embodiment of the present invention differs from the pushbutton switch cover sheet (11) of the first embodiment in the construction of a base sheet (23). That is, while the base sheet (13) used in the first embodiment is a one-layered light transmitting base sheet (13), the base sheet (23) used in this embodiment has two layers: a lightproof upper layer (23a) and a light transmitting lower layer (23b). Otherwise, this embodiment is of the same construction as the pushbutton switch cover sheet (11) of the first embodiment.

FIG. 4 is a sectional view, corresponding to FIG. 2, showing the pushbutton switch cover sheet (21) of this embodiment. As shown in the figure, the base sheet (23) is formed by stacking together a lightproof upper layer (23a) and a light transmitting lower layer (23b). The light proof upper layer (23a) is bonded to the operation plate (12), and has in-groove protrusions (24) protruding into the dividing grooves (14) provided in the operation plate (12). The in-groove protrusions (24) are formed by causing the upper layer (23a) to partially swell from the upper surface of the upper layer (23a) toward the dividing grooves (14) of the operation plate (12).

Further, the portions of the upper layer (23a) opposed to the display portions (16) of the operation plate (12) are cut away to form through-holes (25) continuous with the display portions (16) of the operation plate (12). The upper layer (23a) can be formed of a film-like resin, a rubber-like elastic material, etc., and allows easy production through injection molding on the operation plate (12).

The lower layer (23b) is formed under the upper layer (23a). The lower layer (23b) is composed of a light transmitting layer formed of a rubber-like elastic material and having the same function as the base sheet (13) of the first embodiment.

The lower layer (23b) is formed so as to close from below through-holes (25) continuous with the display portions (16) formed in the upper layer (23a). The provision of the lower layer (23b) can be effected by fixing it to the upper layer (23a) by using an adhesive or through injection molding on the upper layer (23a).

Next, the operation and effects of the cover sheet (21) of this embodiment will be described.

On the upper layer (23a) of the base sheet (23), there are provided the in-groove protrusions (24) protruding into the dividing grooves (14) provided in the operation plate (12), so even when the fingertips hit the edges of adjacent depressing operation members (15), there is no fear in that the fingertips may be injured, and it is possible to provide a pushbutton switch cover sheet (21) of high level of safety.

When the cover sheet (21) of this embodiment is used as an illumination type cover sheet, it is possible to prevent leakage of light through the portions corresponding to the dividing grooves (14) by forming the in-groove protrusions (24) of a lightproof material. Further, the through-holes (25) leading to the light transmitting lower layer (23b) are formed at positions corresponding to the display portions (16) of the operation plate (12), so it is possible to illuminate the display portions (16).

Further, the lower layer (23b) formed of a rubber-like elastic material is provided so as to close the through-holes (25) formed in the operation plate (12), so no water enters the interior of the apparatus (1), thus providing a high waterproof performance.

Figure 5:
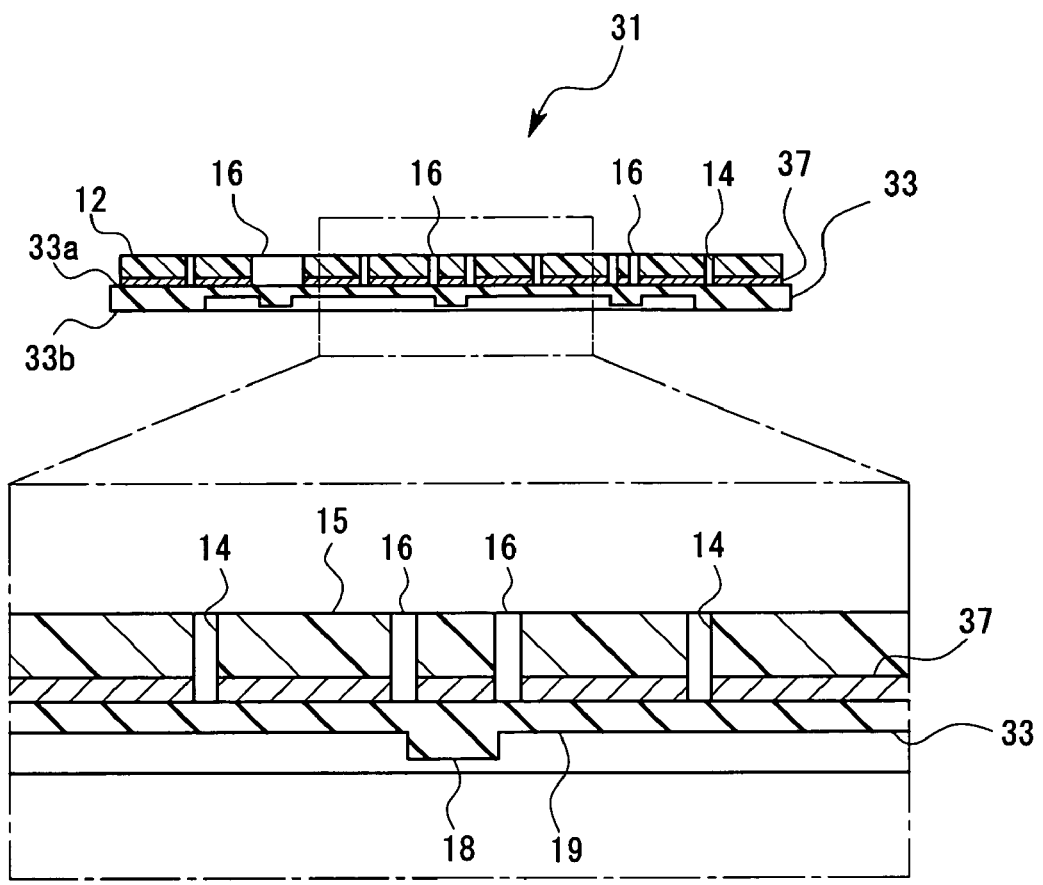
FIG. 5 is a sectional view, corresponding to FIG. 2, of a cover sheet according to a third embodiment of the present invention.

Third Embodiment {FIG. 5}

FIG. 5 is a sectional view, corresponding to FIG. 2, showing a pushbutton switch cover sheet (31) according to a third embodiment of the present invention. The cover sheet (31) of the third embodiment differs from the cover sheet of the first embodiment in that the operation plate is formed as an operation plate (32) of hard resin. Specifically, the operation plate (32) is formed of a material different from that of the metal operation plate (12) of the first embodiment.

A thin metal layer (37) is provided between the operation plate (32) and a base sheet (33) formed of a rubber-like elastic material. There provided no support portions (17). As in the case of the metal operation plate (12) of the first embodiment, when applied to an illumination type cover sheet, the thin metal layer (37) appropriately reflects light from inner light sources, so an improvement in light guiding property is achieved, making it possible to effect illumination uniformly from a desired position.

Apart from being formed of metal alone, the thin metal layer (37) may also be a layer formed of an ink or coating material whose main component is metal, and a material is preferable which can be formed as a thin film and fixed to the operation plate (32). The thin metal layer (37) can be formed by depositing a metal, such as aluminum, chromium, gold, silver, copper, nickel, or tin through evaporation, or by effecting coating using an ink or coating material containing fine particles of such metal. Above all, aluminum, chromium, silver, etc. are preferable since they allow formation of a thin film on the surface of the operation plate (32) relatively easily by evaporation or coating.

From the viewpoint of light guiding property, it is desirable for the thickness of the thin metal layer (37) to range from 10 nm to 80 nm. When the thickness of the thin metal layer (37) is less than 10 nm, the visible light transmittance of the thin metal layer (37) is 50% or more, and it is rather difficult to efficiently reflect the light from the inner light sources. On the other hand, when the thickness exceeds 80 nm, an extra amount of material is required while the light reflection efficiency remains substantially the same.

Figure 6:
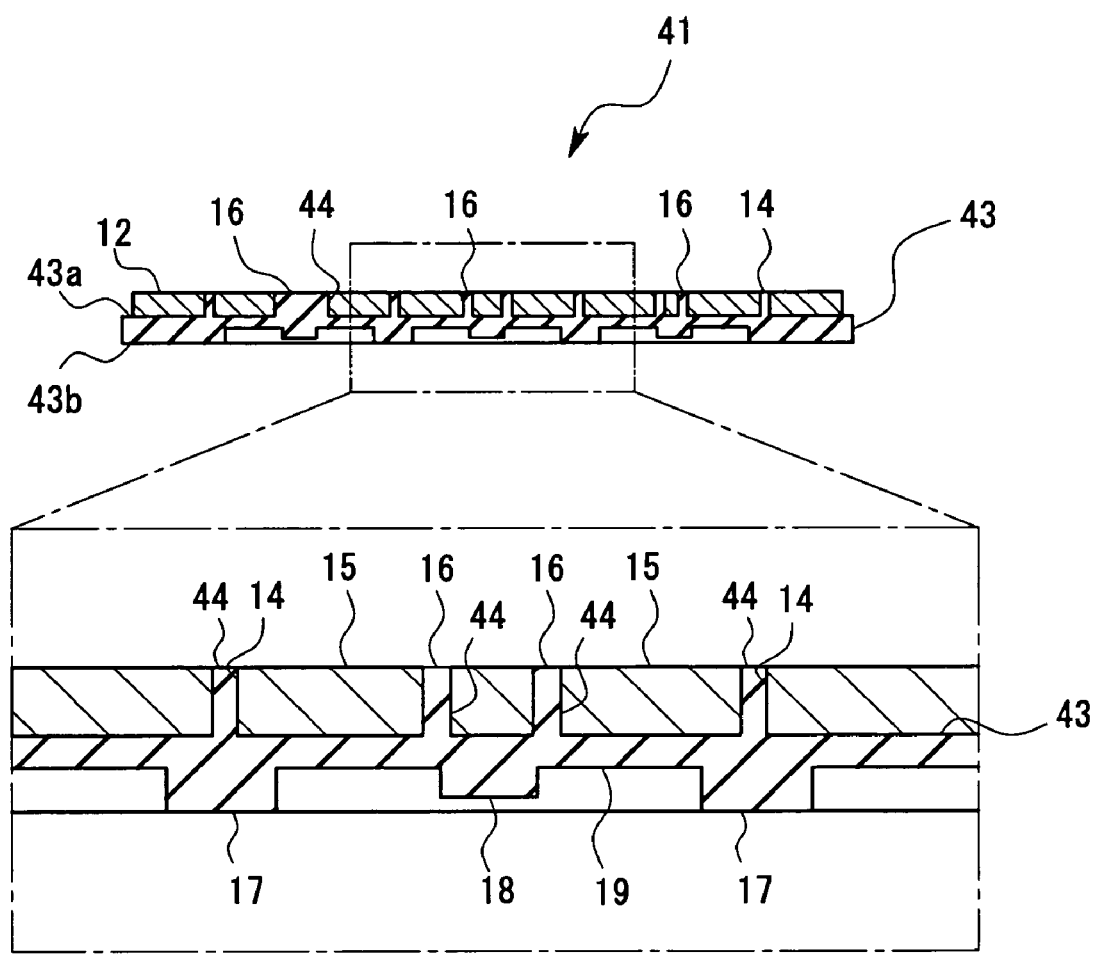
FIG. 6 is a sectional view, corresponding to FIG. 2, of a cover sheet according to a fourth embodiment of the present invention.

Fourth Embodiment {FIG. 6}

While in the first embodiment the dividing grooves (14) and display portions (16) formed in the operation plate (12) by stamping are closed from below by the base sheet (13), in a pushbutton switch cover sheet (41) according to a fourth embodiment of the present invention, the dividing grooves (14) and the display portions (16) are, as shown in FIG. 6, filled with in-groove protrusions (44) extending from a base sheet (43). In this case, when the base sheet (43) is formed of a light transmitting material, it is possible to provide an illumination type cover sheet (41) in which illumination is effected from the dividing grooves (14) and the display portions (16). In contrast, when the base sheet (43) is formed of a lightproof material, it is possible to provide a cover sheet (41) in which no light leakage occurs from the dividing grooves (14) and the display portions (16).

Since it has the in-groove protrusions (44) in the dividing grooves (14) and the display portions (16), the cover sheet (41) makes it possible to prevent the fingertips from being injured by the dividing grooves (14) and the display portions (16).

Figure 7:
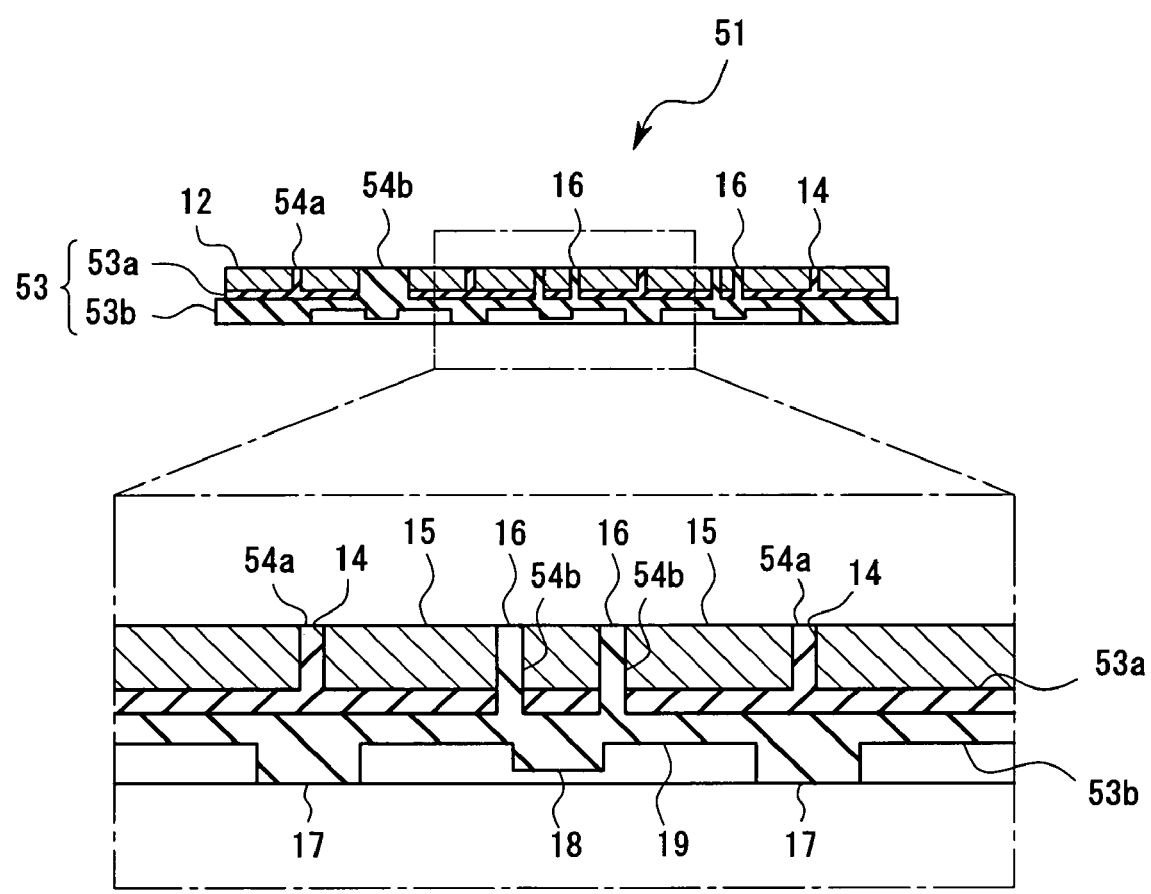
FIG. 7 is a sectional view, corresponding to FIG. 2, of a cover sheet according to a fifth embodiment of the present invention.

Fifth Embodiment {FIG. 7}

While in the second embodiment the through-holes (25) continuous with the display portions (16) of the operation plate (12) are closed from below by the base sheet (13), in a push button switch cover sheet (51) according to a fifth embodiment of the present invention, there are formed, as shown in FIG. 7, in-groove protrusions (54a) protruding into the dividing grooves (14) from an upper layer (53a) of a base sheet (53) and in-groove protrusions (54b) protruding into the display portions (16) from an lower layer (53b) of the base sheet (53). By forming the upper layer (53a) of a lightproof material and the lower layer (53b) of a light transmitting material, the cover sheet (51) can be formed as an illumination type cover sheet (51) in which no light leaks through the dividing grooves (14) and in which illumination is effected through the display portions (16). Further, the cover sheet (51) has the in-groove protrusions (54a) and (54b) in the dividing grooves (14) and the display portions (16), so the cover sheet (51) makes it possible to prevent the fingertips from being injured by the dividing grooves (14) and the display portions (16).

Figure 8:
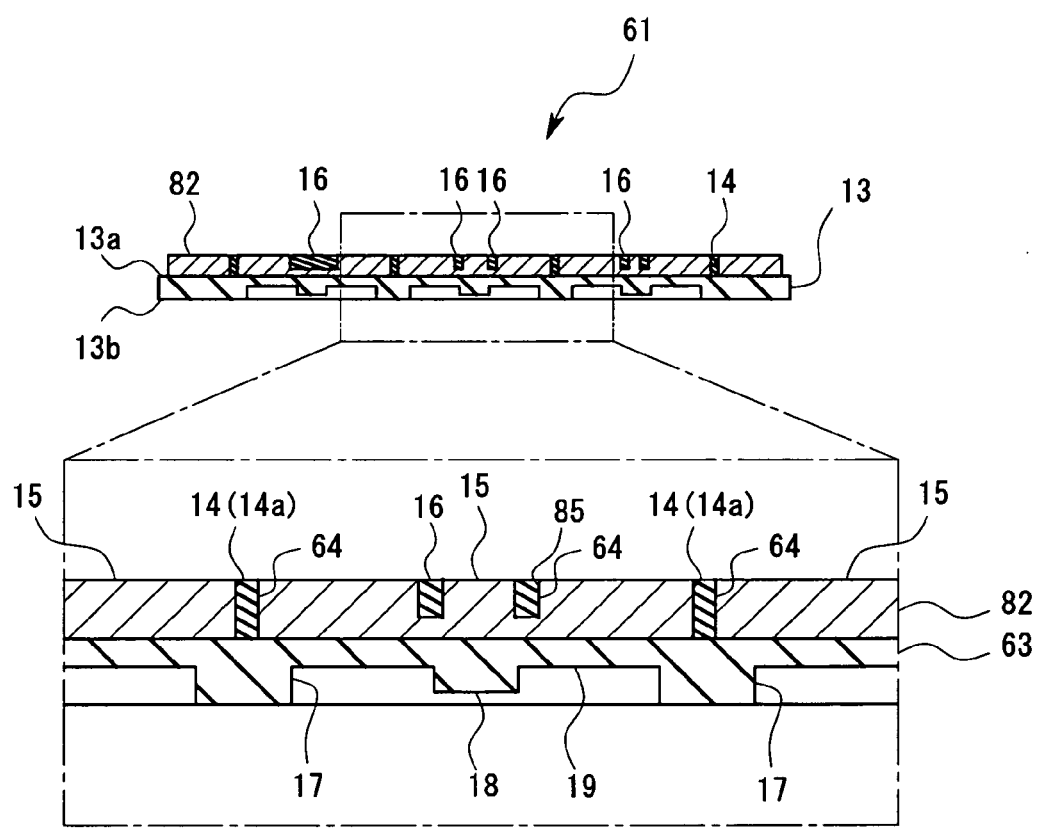
FIG. 8 is a sectional view, corresponding to FIG. 2, of a cover sheet according to a sixth embodiment of the present invention.

Sixth Embodiment {FIG. 8}

While in the first embodiment the dividing grooves (14) and display portions (16) formed in the operation plate (12) by stamping are closed from below by the base sheet (13), in a pushbutton switch cover sheet (61) according to a sixth embodiment of the present invention, the dividing grooves (14) and the display portions (16) are, as shown in FIG. 8, filled with groove filling members (64) formed of a rubber-like elastic material. The pushbutton switch cover sheet (61) differs from the pushbutton switch cover sheet (41) of the fourth embodiment shown in FIG. 6, in which the grooves are filled with the in-groove protrusions (44), in that while the groove filling members (64) are formed of a rubber-like elastic material. The material of the groove filling members (64) differs from the material forming the base sheet (63). The groove filling members (64) are fixed to the inner side surfaces (14a) of the dividing grooves (14). Further, the operation plate (82) differs from, for example, the pushbutton switch cover sheet (41) of the fourth embodiment shown in FIG. 6, etc., in which the through-holes (25) are provided in the operation plate (12) to form the display portions (16), in that the display portions (16) are formed by halfway through-holes (85).

In the through-holes (25) forming the dividing grooves (14), the groove filling members (64) are fixed to the inner side surfaces (14a) of the dividing grooves (14). Thus, the rubber-like elastic material forming the groove filling members (64) connect together the depressing operation members (15) adjacent to each other through the intermediation of the dividing grooves (14), and during depressing operation, the rubber-like elastic material expands and contracts, following the depressing operation members (15). The inner side surfaces (14a) of the dividing grooves will not be exposed. This rubber-like elastic material is a flexible polymeric material exhibiting an elongation percentage of 200% or more, more preferably, 300% or more. A 180° peeling test shows that this rubber-like elastic material has a bonding force of 3 N/mm or more, more preferably, 5 N/mm or more, with respect to the operation plate (12). When the elongation percentage is less than 200%, the groove filling members (64) may possibly suffer breakage. Further, the load at the time of depressing operation is rather large. When the bonding force is less than 3 N/mm, the groove filling members (64) could possibly separate from the groove inner side surfaces (14a). The display portions (16) formed by the halfway through-holes (85) are likewise filled with the groove filling members (64). The formation of the groove filling members (64) can be effected by injecting a flexible polymeric material in the form of liquid resin, ink, coating material, adhesive or the like into the dividing grooves (14) and the display portions (16) and curing the same.

Examples of the flexible polymeric material that can be used include a liquid resin, such as silicone type resin or urethane type resin, vinyl acetate type resin, vinyl chloride type resin, chloroprene rubber, nitrile rubber, and styrene butadiene rubber. The curing can be effected according to the material by, for example, room temperature curing, reaction curing, thermo-curing, humidity curing, UV curing, and photo-curing.

In the cover sheet (61), the dividing grooves (14) and the display portions (16) are filled with the groove filling members (64). The probability that the fingers may be injured by the edges of the dividing grooves (14) and the display portions (16) is greatly reduced. Due to the construction in which the depressing operation members (15) are connected together by the groove filling members (64), the depression load is somewhat larger as compared with the case in which there are no groove filling members (64). However, the groove filling members (64) are formed of a flexible polymeric material, so depressing operation is possible. Further, the groove filling members (64) are fixed to the groove inner side surfaces (14a), so even when a difference in height is generated between the depressed depressing operation member (15) and the depressing operation member (15) adjacent thereto, the edges of the depressing operation members (15) are not exposed since the depressing operation members (15) are connected together by the groove filling members (64). Thus, in the probability that the fingers may be injured or get caught is greatly reduced.

Figure 9:
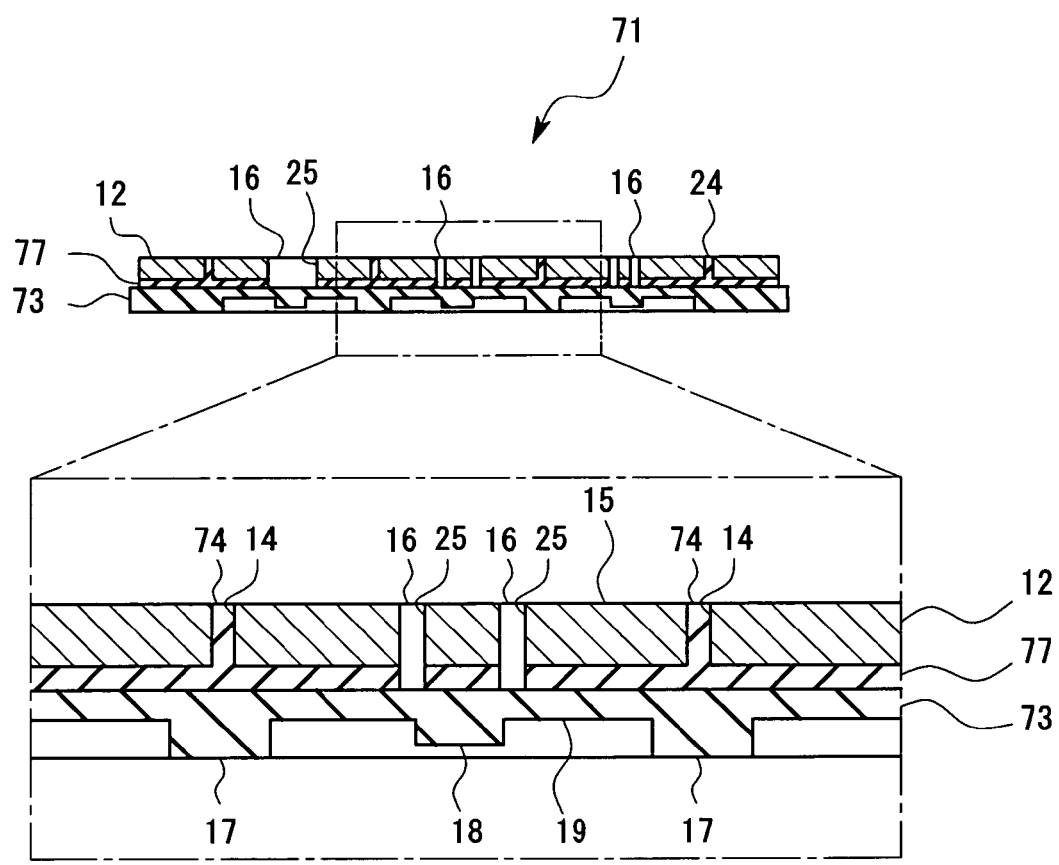
FIG. 9 is a sectional view, corresponding to FIG. 2, of a cover sheet according to a seventh embodiment of the present invention.

Seventh Embodiment {FIG. 9}

In a pushbutton switch cover sheet (71) according to a seventh embodiment of the present invention, the dividing grooves (14) provided in the operation plate (12) are filled with groove filling members (74) formed of a rubber-like elastic material, and the groove filling members (74) swell down to the back surface (12b) of the operation plate (12) and reach the back surface (12b) of the operation plate (12) to form a covering layer (77) covering the entire back surface (12b). Though similar to the cover sheet (21) of the second embodiment shown in FIG. 4 in the layer construction, the cover sheet (71) is composed of a base sheet (73) and the covering layer (77), whereas the cover sheet (21) of the second embodiment is composed of the upper layer (23a) and the lower layer (23b) of the base sheet. Further, in the case in which the in-groove protrusions (24) of the cover sheet (21) of the second embodiment are not fixed to the groove inner side surfaces (14a), the depression load is small, whereas, in the cover sheet (71) of this embodiment, the groove filling members (74) are fixed to the groove inner side surfaces (14a), so the depression load is large. However, the covering layer (77) can be formed by using a rubber-like elastic material which expands more than the base sheet (73), so the depression load is not so large as to interfere with the depressing operation.

In the cover sheet (71), the edges of the depressing operation members (15), that is, the edges of the dividing grooves (14) are connected to the groove filling members (74), so, as compared with the cover sheet (21), in which the in-groove protrusions (24) are not fixed to the groove inner side surfaces (14a), it is possible to reduce the fear in that the fingers or the like may be injured by the edges of the depressing operation members (15).

Figure 10:
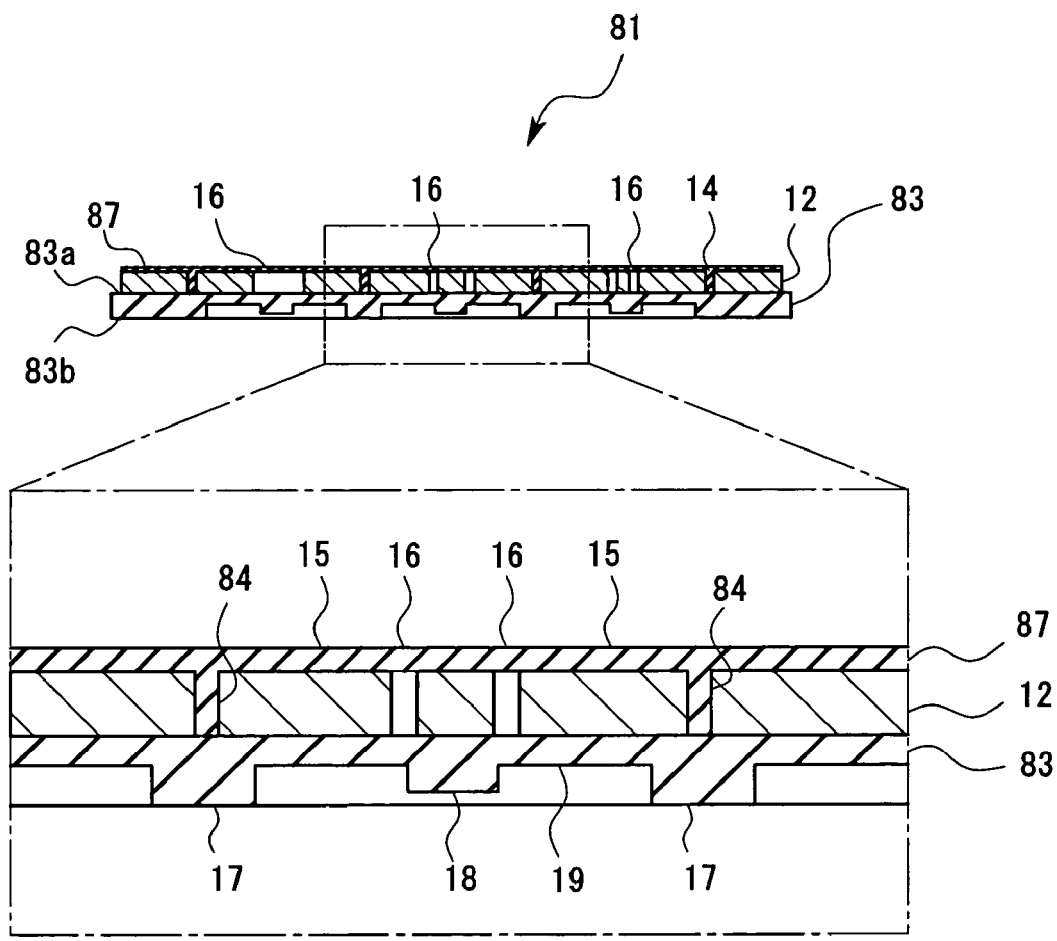
FIG. 10 is a sectional view, corresponding to FIG. 2, of a cover sheet according to an eighth embodiment of the present invention.

Eighth Embodiment {FIG. 10}

In a pushbutton switch cover sheet (81) according to an eighth embodiment of the present invention, the dividing grooves (14) provided in the operation plate (12) are filled with groove filling members (84) formed of a rubber-like material, and the groove filling members (84) swell up to the upper surface (12a) of the operation plate (12) and reach the upper surface (12a) of the operation plate (12) to thereby form a covering layer (87) covering the entire upper surface (12a).

In the cover sheet (81), not only a part of the upper surface (12a) of the operation plate (12) connected to the groove edges of the dividing grooves (14) but also the entire upper surface (12a) is covered with the covering layer (87), so it also serves to protect the upper surface (12a) of the operation plate (12). When the operation plate (12) is formed of a metal plate, it is possible to maintain the metallic gloss for good. In this case, it is necessary for the tone of the operation plate (12) formed of metal to be visually recognized, so it is desirable for the rubber-like elastic material forming the covering layer (87) to be a light transmitting material. Further, the groove filling members (84) are in the dividing grooves (14), so the covering layer (87) is not easily broken if pushed with a pointed object.

The groove filling members (84) and the covering layer (87) may be formed of the same material, or separately. To be more specific, when forming the groove filling members (84) and the covering layer (87) of the same material, it is possible to use the same rubber-like elastic material as used in the above embodiments. When forming the groove filling members (84) and the covering layer (87) of different materials, it is possible to use the above-mentioned rubber-like elastic material for the groove filling members (84) while forming the covering layer (87) by coating with a transparent resin or by using an adhesive tape. For example, it is possible to use a film-like resin of a polyolefin type, a polyester type, a polyurethane type, etc. It is also possible to use an adhesive film formed by attaching an adhesive layer to a base member formed of a film of a polyolefin type resin, such as polyethylene or polypropylene, or a film of a polyester type resin, such as polyethylene terephthalate or polybutylene terephthalate. Further, it is also possible to perform spray coating after forming the groove filling members (84). In the cover sheet (81), the dividing grooves (14) and the display portions (16) are covered with the covering layer (87), so there is no fear in that the fingers may enter the dividing grooves (14) or the display portions (16), thus achieving a high level of safety. Further, not being formed of metal, the depressing operation members (15) can provide the feel of a rubber-like elastic material, generating a slippage preventing effect and mildness.

Figure 11:
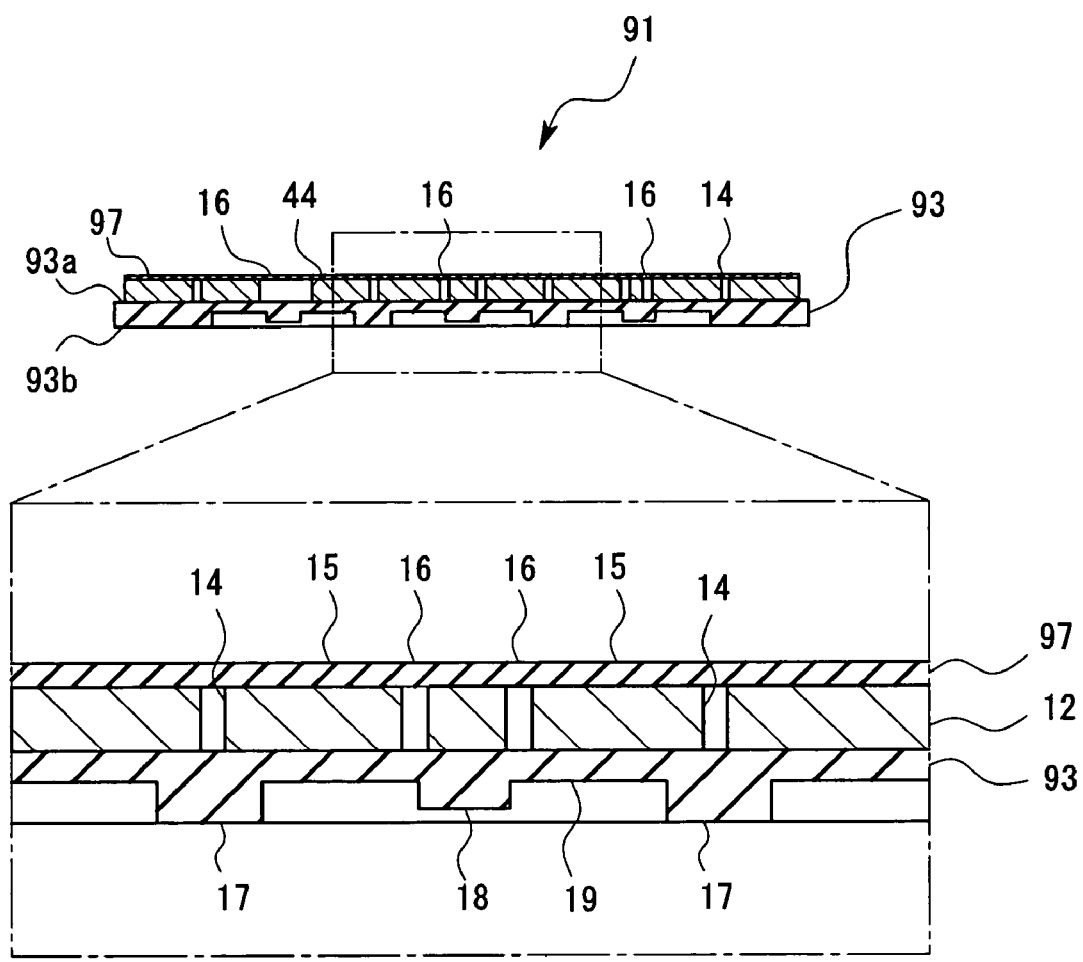
FIG. 11 is a sectional view, corresponding to FIG. 2, of a cover sheet according to a ninth embodiment of the present invention.

Ninth Embodiment {FIG. 11}

A pushbutton switch cover sheet (91) according to a ninth embodiment of the present invention is the same as the pushbutton switch cover sheet (81) of the eighth embodiment shown in FIG. 10 in that there is formed a covering layer (97) covering the upper surface (12a) of the operation plate (12). However, the pushbutton switch cover sheet (91) differs from the pushbutton switch cover sheet (81) in that there are formed no groove filling member (84) to enter the dividing grooves (14).

As compared with the cover sheet (71) of the eighth embodiment, the cover sheet (81) of this embodiment has no groove filling members filling the dividing grooves (14), so there is a problem in that the covering layer (97) is somewhat subject to breakage between the depressing operation members (15). However, due to the absence of the groove filling members, the cover sheet (81) of this embodiment is advantageous in that the depressing operation load is small. When forming no groove filling members in the dividing grooves (14) and the display portions (16), it is possible to adopt, for example, a method in which the covering layer (97) is bonded to an adhesive provided on the upper surface (12a) of the operation plate (12) or a method in which the dividing grooves (14) and the display portions (16) are temporarily filled, removing the temporary filling material after forming the covering layer (97) through coating or the like.

Figure 15:
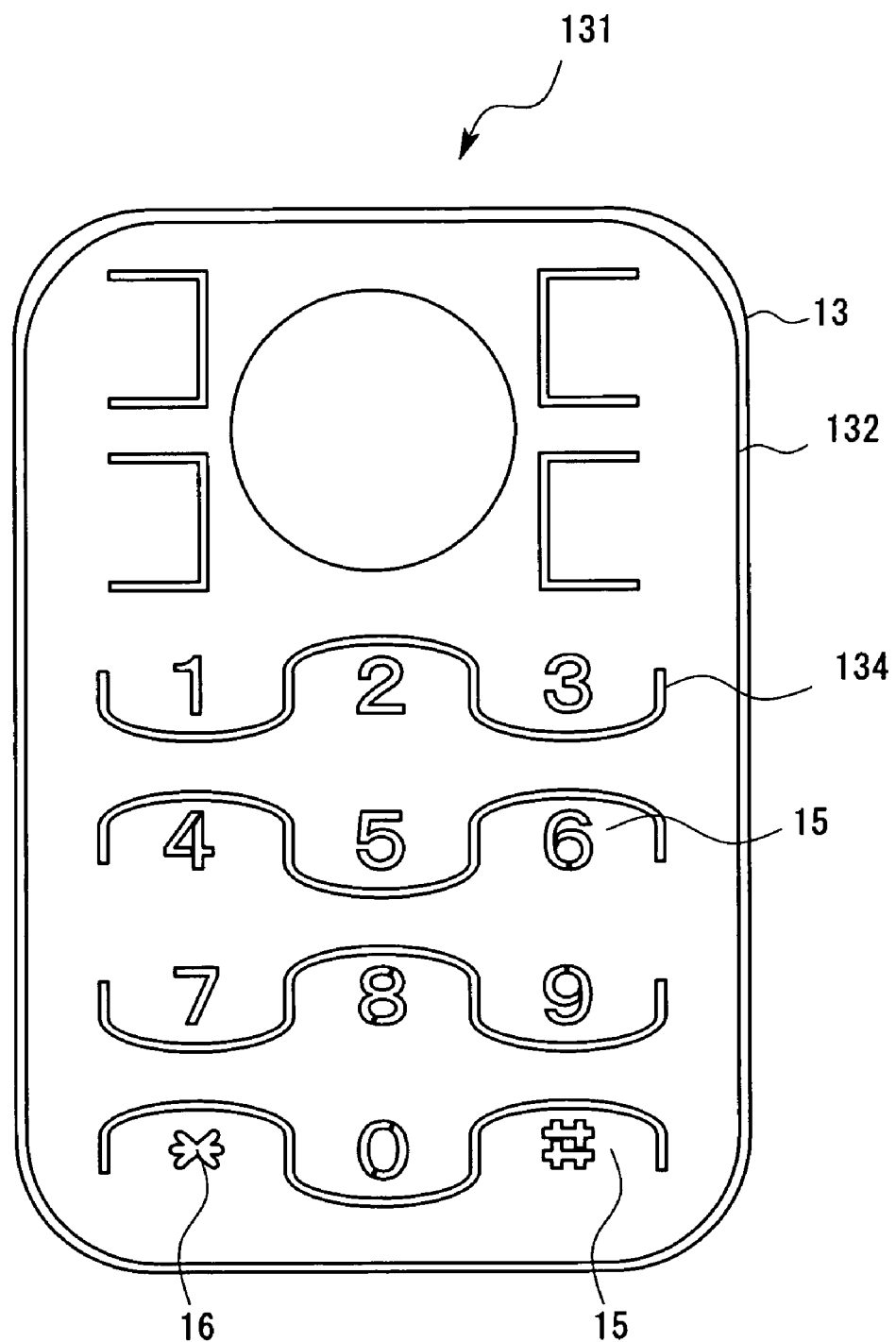
FIG. 15 is a plan view, corresponding to FIG. 1, of a fourth modification of a cover sheet according to an embodiment of the present invention.
Figure 16:
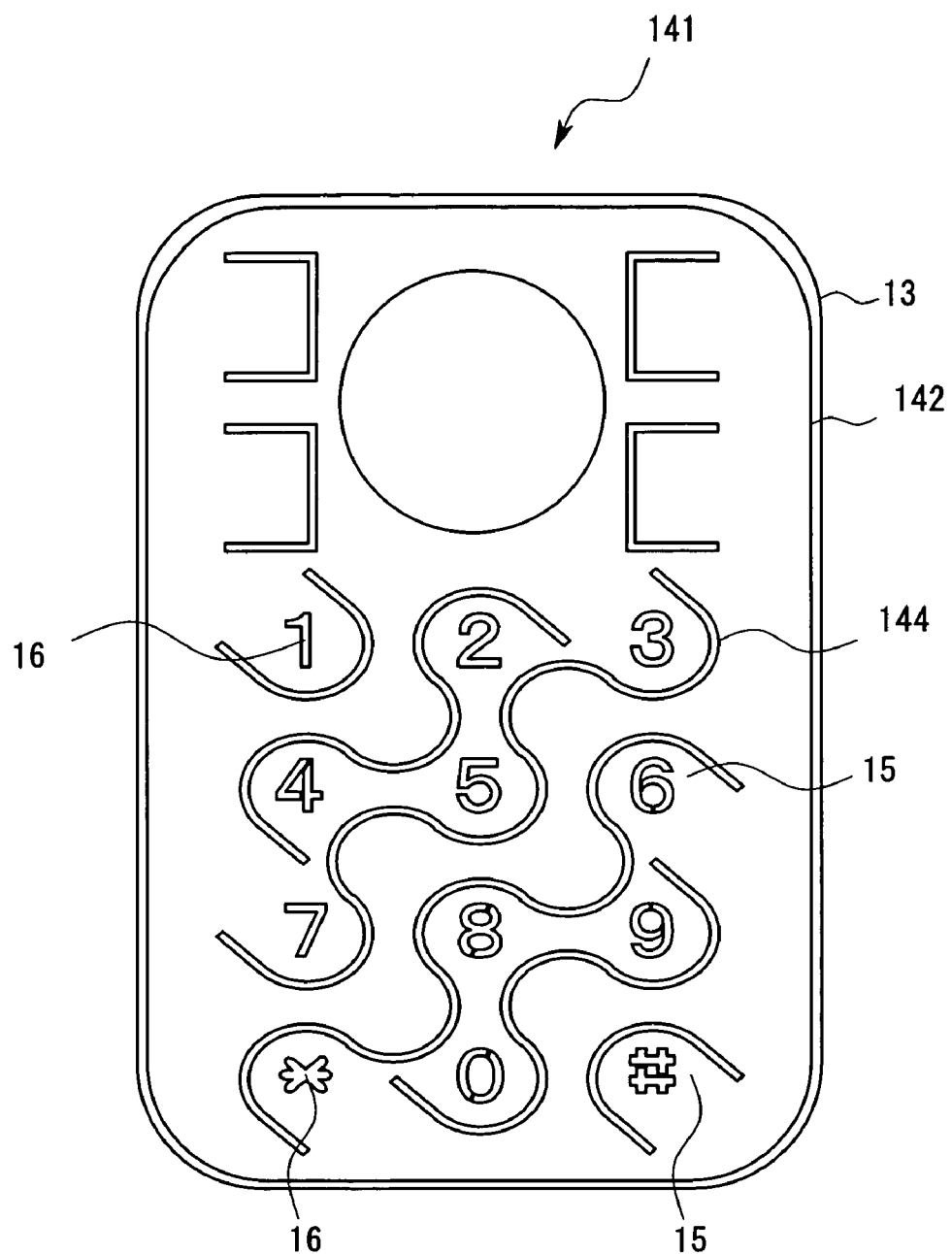
FIG. 16 is a plan view, corresponding to FIG. 1, of a fifth modification of a cover sheet according to an embodiment of the present invention.

Instead of the operation plate (12), (32) of the above-described embodiments shown in FIGS. 1 through 11, it is also possible to use, as in the case of pushbutton switch cover sheets (101), (111), (121), (131), (141) respectively shown in FIGS. 12 through 16, operation plates (102), (112), (122), (132), (142), in which the configurations of the respective dividing grooves (104), (114), (124), (134), (144) and of the depressing operation members (15) are modified. The dividing grooves (134), (144) shown in FIG. 15 and FIG. 16 are formed in a round-wave-like configuration.

Figure 12:
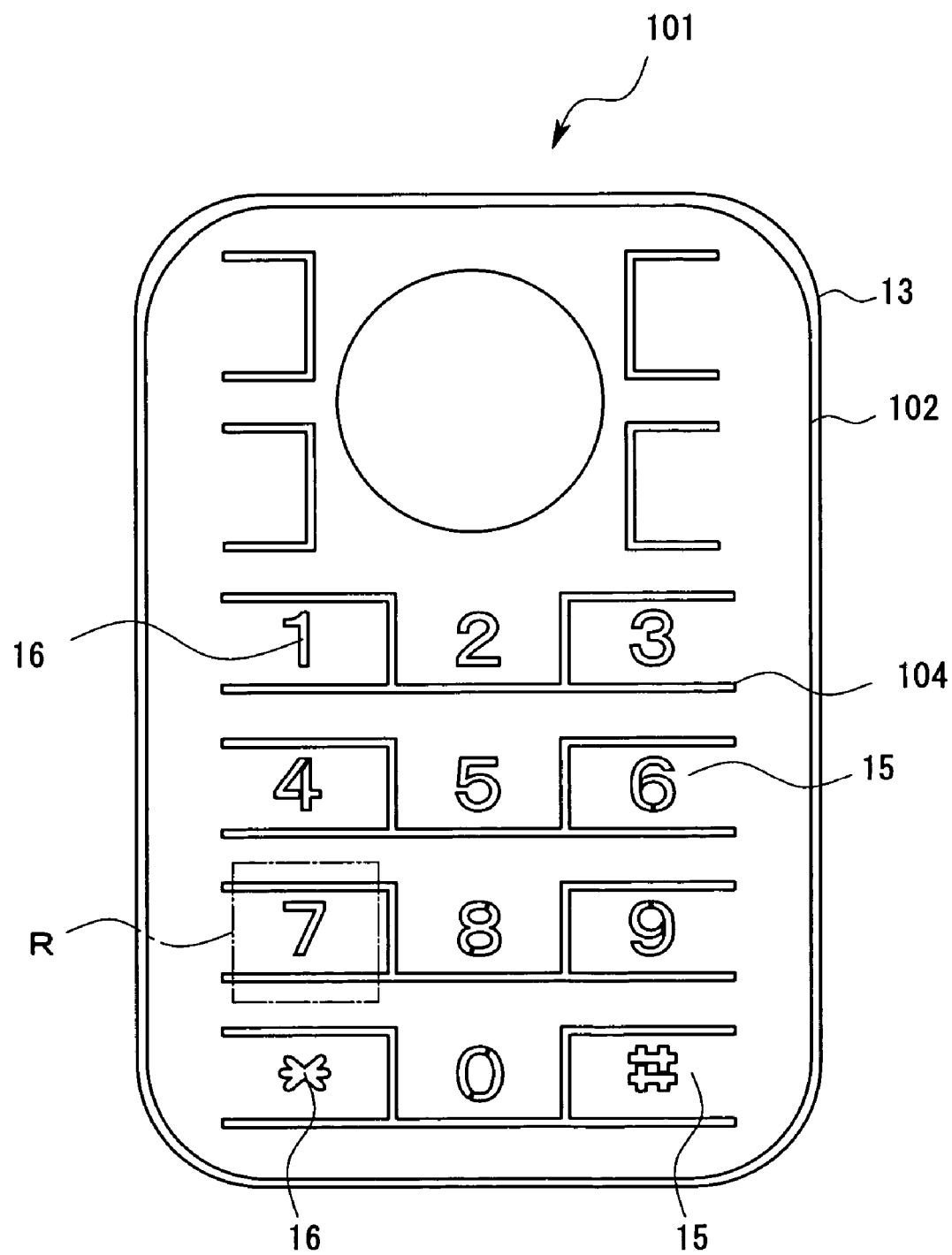
FIG. 12 is a plan view, corresponding to FIG. 1, of a first modification of a cover sheet according to an embodiment of the present invention.
Figure 13:
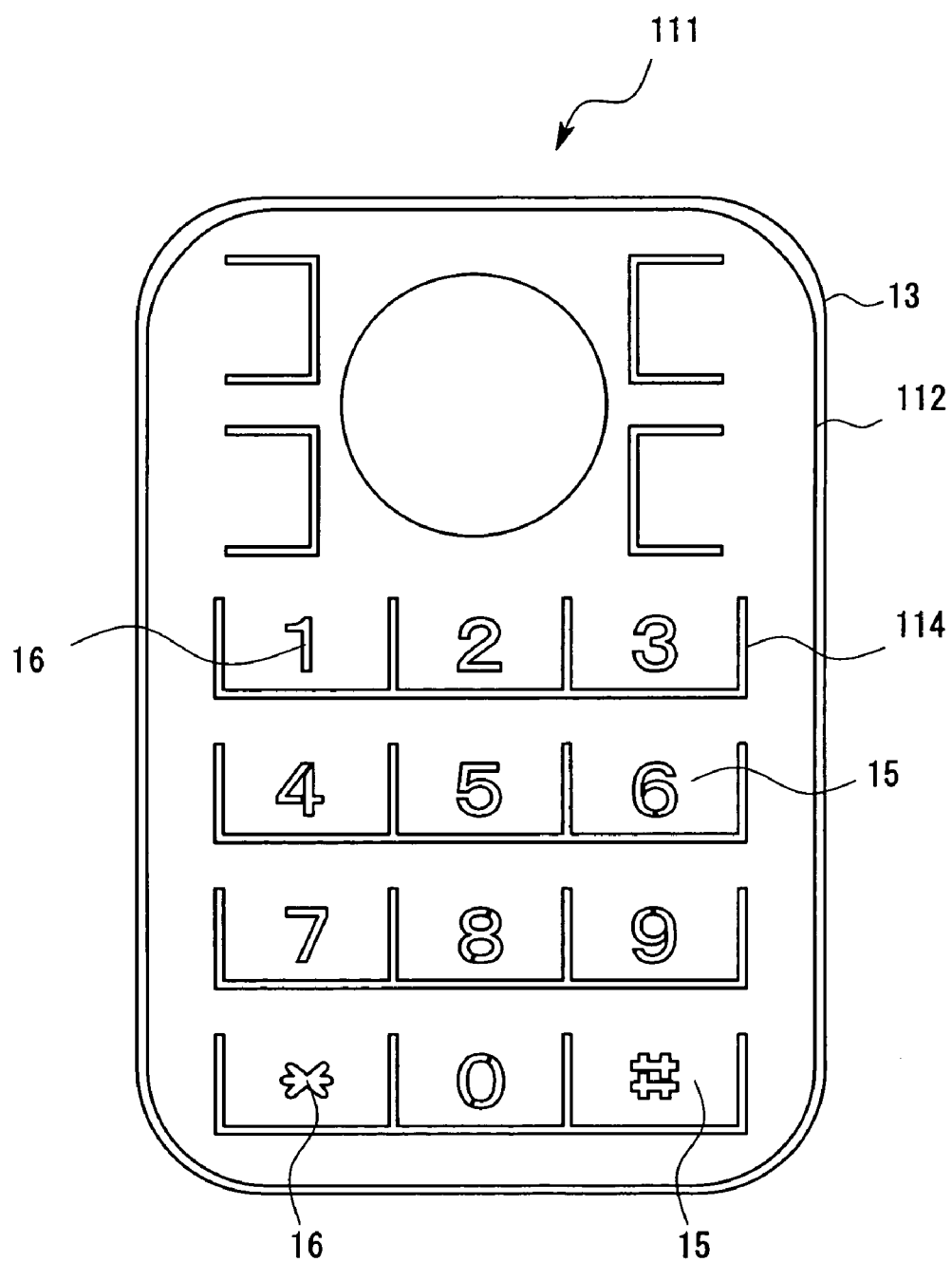
FIG. 13 is a plan view, corresponding to FIG. 1, of a second modification of a cover sheet according to an embodiment of the present invention.
Figure 14:
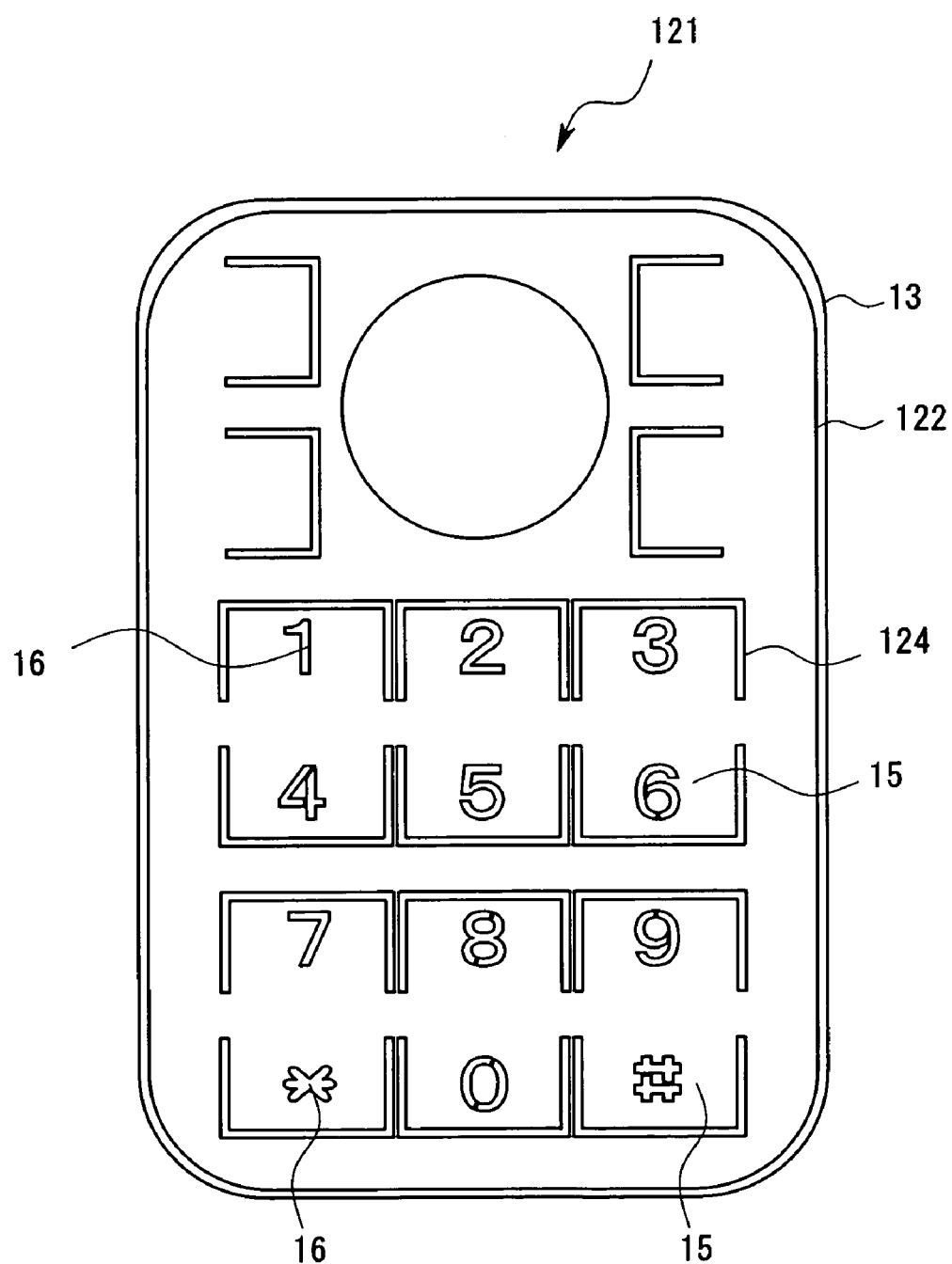
FIG. 14 is a plan view, corresponding to FIG. 1, of a third modification of a cover sheet according to an embodiment of the present invention.
Figure 17A:
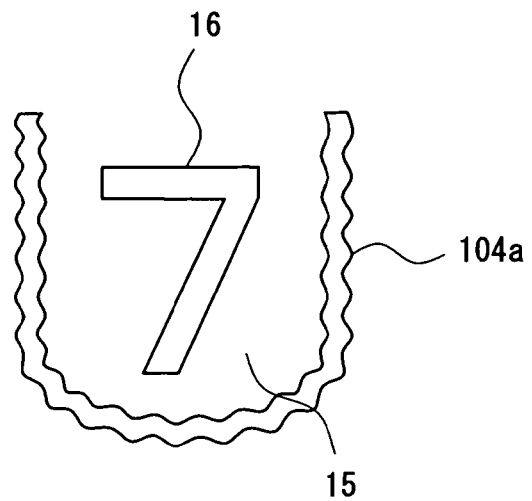
FIGS. 17A, 17B, and 17C are all enlarged plan views of a portion corresponding to the region R of FIG. 12, showing other modes of the dividing groove.
Figure 17B:
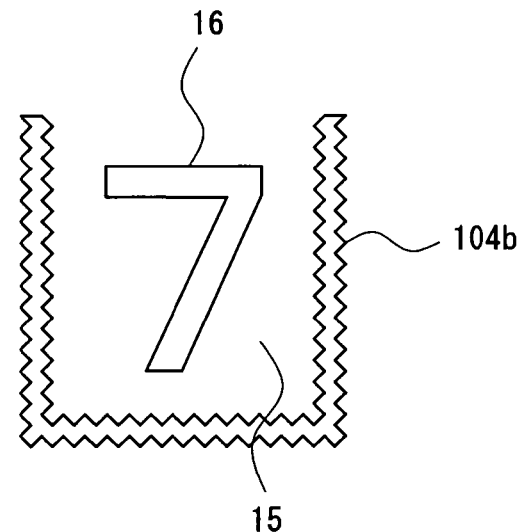
Figure 17C:
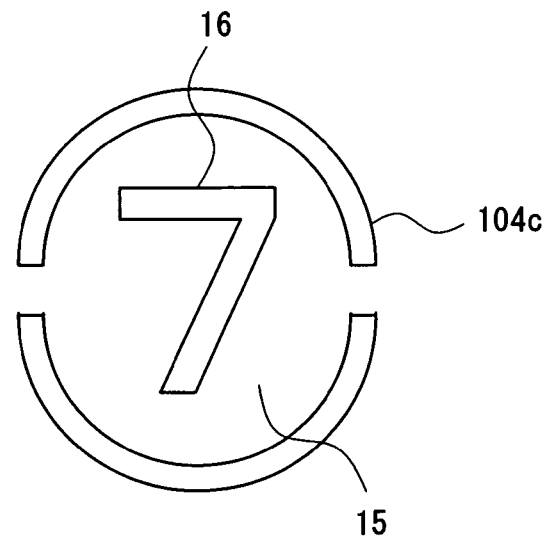
Figure 18:
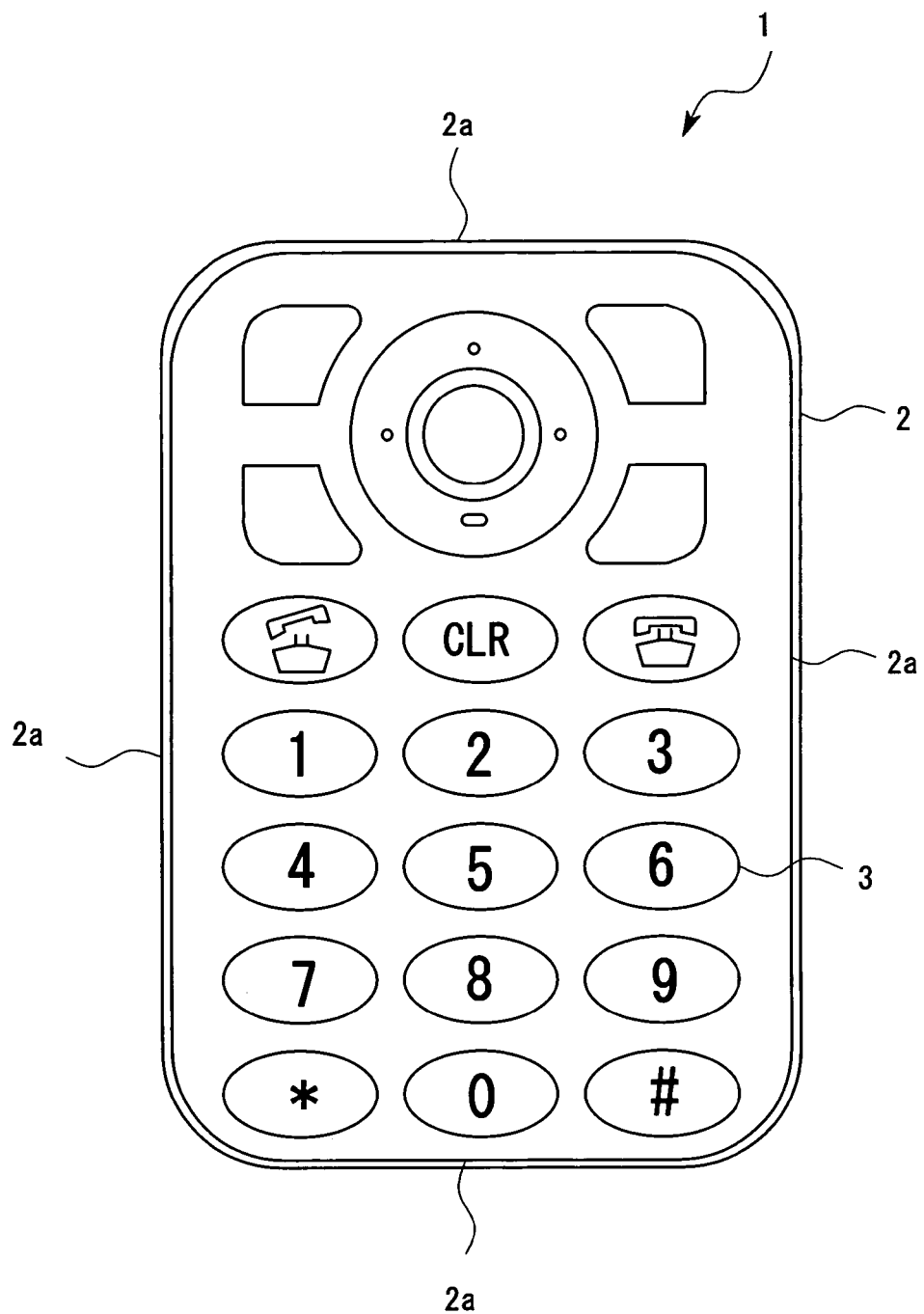
FIG. 18 is an outward plan view of a mobile phone.
Figure 19:
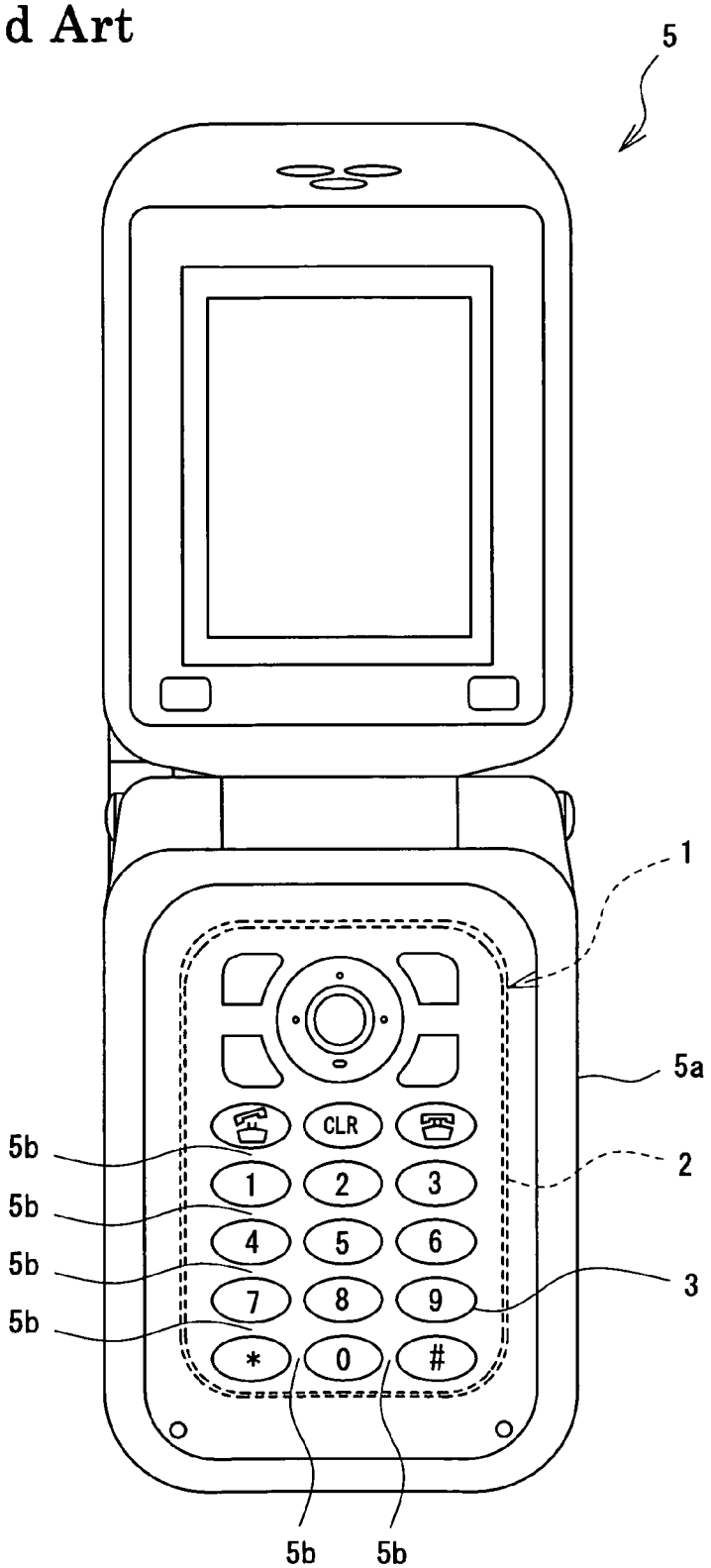
FIG. 19 is a plan view of a conventional pushbutton switch cover member provided on the mobile phone of FIG. 18.

FIGS. 17A, 17B, and 17C are enlarged views of depressing operation members (15), showing the portion corresponding to the region R of FIG. 12. It is also possible to adopt dividing grooves (104*a*), (104*b*), (104*c*) as shown in FIGS. 17A, 17B, 17C.

While in the above-described embodiments the present invention is applied to the cover sheet (11), (21), (31), (41), (51), (61), (71), (81), (91), (101) through (141) for use in the mobile phone (1), the present invention is also applicable to other apparatuses, such as a PDA or a remote controller.

The description of the present invention should not be construed restrictively; advantages, features, and uses of the present invention will become still more apparent from the following description given with reference to the accompanying drawings. Further, it should be understood that all appropriate modifications made without departing from the gist of the present invention are covered by the scope of the present invention. While various embodiments of the present invention are described, it should be understood that they have been presented by way of example only, and not as a limitation. Thus, the breadth and scope of the present invention should not be limited by any of the above-described exemplary embodiments.

What is claimed is

1. The single operation plate having one depressing operation member and one dividing groove and formed of group consisting of a metal and a hard resin; the dividing groove defining the depressing operation member as a part of the single operation plate, and the depressing operation member being capable of displacement through depression.

2. A pushbutton switch cover sheet according to claim 1, wherein the depressing operation member is formed as a tongue-shaped member.

3. A pushbutton switch cover sheet according to claim 1, wherein the dividing groove is formed in a round-wave-like configuration; and the depressing operation member is formed on either side of the dividing groove.

4. A pushbutton switch cover sheet according to claim 1, wherein the depressing operation member is provided with a display portion formed of at least any one of a character, a number, a figure, a symbol in the form of a hole extending through the operation plate.

5. A pushbutton switch cover sheet according to claim 1, wherein the single operation plate has a thickness of 50 μm to 2000 μm.

6. A pushbutton switch cover sheet according to claim 1, further comprising a base sheet formed of a rubber-like elastic material and provided on a back surface of an operation surface of the operation plate.

7. A pushbutton switch cover sheet according claim 6, further comprising a pusher provided on the back side of the base sheet at a position below the depressing operation member and adapted to be pressed against a contact electrode.

8. A pushbutton switch cover sheet according to claim 6, further comprising an in-groove protrusion provided in the base sheet and protruding into the dividing groove of the operation plate.

9. A pushbutton switch cover sheet according to claim 8, wherein the in-groove protrusion is lightproof.

10. A pushbutton switch cover sheet according to claim 8, wherein the in-groove protrusion is a groove filling member fixed to the inner side surface of the dividing groove and filling the dividing groove.

11. The in-groove protrusion provided in the base sheet and protruding into the dividing groove of the operation plate.

* * * * *

UNITED STATES PATENT AND TRADEMARK OFFICE
CERTIFICATE OF CORRECTION

PATENT NO. : 7,465,889 B2 Page 1 of 1
APPLICATION NO. : 11/407228
DATED : December 16, 2008
INVENTOR(S) : Dalsuke Nakajima It is certified that error appears in the above-identified patent and that said Letters Patent is hereby corrected as shown below:

Claim 1 beginning with line 32 in column 15 should read as follows:

1. A pushbutton switch cover sheet comprising:
a single operation plate having at least one depressing operation member and at least one dividing groove, the single operation plate being formed of a material from group consisting of a metal and a hard resin, the dividing groove, defining the depressing operation member as a part of the single operation plate, and the depressing operation member being capable of displacement through depression.

Further, claim 11 beginning with line 34 in column 16 should read as follows:

11. A method of manufacturing a pushbutton switch cover sheet having a base sheet and an in-groove protrusion, the method comprising the steps of:
fusing the base sheet to an operation plate;
providing the in-groove protrusion protruding into a dividing groove of the operation plate from the base sheet;
and
integrating the operation plate and the base sheet.

Signed and Sealed this

Seventeenth Day of February, 2009

JOHN DOLL
*Acting Director of the United States Patent and Trademark Office*

UNITED STATES PATENT AND TRADEMARK OFFICE
CERTIFICATE OF CORRECTION

| | |
|---|---|
| PATENT NO. | : 7,465,889 B2 |
| APPLICATION NO. | : 11/407228 |
| DATED | : December 16, 2008 |
| INVENTOR(S) | : Daisuke Nakajima |

It is certified that error appears in the above-identified patent and that said Letters Patent is hereby corrected as shown below:

Claim 1 beginning with line 32 in column 15 should read as follows:

1. A pushbutton switch cover sheet comprising:
a single operation plate having at least one depressing operation member and at least one dividing groove, the single operation plate being formed of a material from group consisting of a metal and a hard resin, the dividing groove, defining the depressing operation member as a part of the single operation plate, and the depressing operation member being capable of displacement through depression.

Further, claim 11 beginning with line 34 in column 16 should read as follows:

11. A method of manufacturing a pushbutton switch cover sheet having a base sheet and an in-groove protrusion, the method comprising the steps of:
fusing the base sheet to an operation plate;
providing the in-groove protrusion protruding into a dividing groove of the operation plate from the base sheet;
and
integrating the operation plate and the base sheet.

This certificate supersedes the Certificate of Correction issued February 17, 2009.

Signed and Sealed this

Seventh Day of April, 2009

JOHN DOLL
*Acting Director of the United States Patent and Trademark Office*